US011003980B2

(12) United States Patent
Kato

(10) Patent No.: US 11,003,980 B2
(45) Date of Patent: May 11, 2021

(54) WIRELESS COMMUNICATION DEVICE AND ARTICLE WITH THE SAME ATTACHED THERETO

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 586 days.

(21) Appl. No.: 15/616,057

(22) Filed: Jun. 7, 2017

(65) Prior Publication Data

US 2017/0270401 A1 Sep. 21, 2017

Related U.S. Application Data

(63) Continuation of application No. PCT/JP2015/073320, filed on Aug. 20, 2015.

(30) Foreign Application Priority Data

Dec. 16, 2014 (JP) .............................. JP2014-253749

(51) Int. Cl.
*H01Q 9/26* (2006.01)
*H01Q 9/06* (2006.01)
(Continued)

(52) U.S. Cl.
CPC ..... *G06K 19/07783* (2013.01); *G06K 19/027* (2013.01); *G06K 19/077* (2013.01);
(Continued)

(58) Field of Classification Search
CPC ....... G06K 19/07783; G06K 19/07786; G06K 9/4604; G06K 19/07777–07792;
(Continued)

(56) References Cited

U.S. PATENT DOCUMENTS

2004/0017330 A1* 1/2004 Mukoyama .............. H01Q 1/14
343/895
2005/0024290 A1* 2/2005 Aisenbrey ........... B29C 45/0013
343/873
(Continued)

FOREIGN PATENT DOCUMENTS

JP 06-62616 U 9/1994
JP 2005-130354 A 5/2005
(Continued)

OTHER PUBLICATIONS

Official Communication issued in International Patent Application No. PCT/JP2015/073320, dated Nov. 10, 2015.

*Primary Examiner* — Ricardo I Magallanes
(74) *Attorney, Agent, or Firm* — Keating & Bennett, LLP

(57) ABSTRACT

Two input/output terminals are provided on a lower surface of an RFIC element. An antenna element includes an elastic material and connecting portions respectively connected to
(Continued)

the two input/output terminals of the RFIC element, a loop that includes the connecting portions, and open-ended linear antenna portions that define and function as radiators. The line width of the loop is greater than that of each of the linear antenna portions.

25 Claims, 17 Drawing Sheets

(51) Int. Cl.
  *H01Q 1/36* (2006.01)
  *G06K 19/077* (2006.01)
  *H01Q 1/22* (2006.01)
  *G06K 19/02* (2006.01)
  *H01Q 1/27* (2006.01)

(52) U.S. Cl.
  CPC . *G06K 19/07728* (2013.01); *G06K 19/07747* (2013.01); *G06K 19/07758* (2013.01); *H01Q 1/22* (2013.01); *H01Q 1/2225* (2013.01); *H01Q 1/36* (2013.01); *H01Q 9/065* (2013.01); *H01Q 9/26* (2013.01); *H01Q 1/273* (2013.01)

(58) Field of Classification Search
  CPC ...... G06K 19/027; H01Q 1/2208; H01Q 1/14; H01Q 1/2216; H01Q 1/362; H01Q 1/2225; H01Q 9/26; H01Q 7/00
  See application file for complete search history.

(56) References Cited

U.S. PATENT DOCUMENTS

| | | | |
|---|---|---|---|
| 2008/0150690 | A1 | 6/2008 | Lin et al. |
| 2010/0181379 | A1* | 7/2010 | Okegawa ............. H01Q 13/106 |
| | | | 235/488 |
| 2011/0175785 | A1* | 7/2011 | Choo ................ G06K 19/07749 |
| | | | 343/822 |
| 2014/0326791 | A1 | 11/2014 | Ishida et al. |
| 2015/0154488 | A1* | 6/2015 | Heo ................. G06K 19/07786 |
| | | | 235/488 |

FOREIGN PATENT DOCUMENTS

| | | |
|---|---|---|
| JP | 2009-003829 A | 1/2009 |
| JP | 2010-176451 A | 8/2010 |
| JP | 2011-151805 A | 8/2011 |
| JP | 2013-047880 A | 3/2013 |
| JP | 2013-089022 A | 5/2013 |
| JP | 2014-191713 A | 10/2014 |
| WO | WO-2013115019 A1 * | 8/2013 |

* cited by examiner

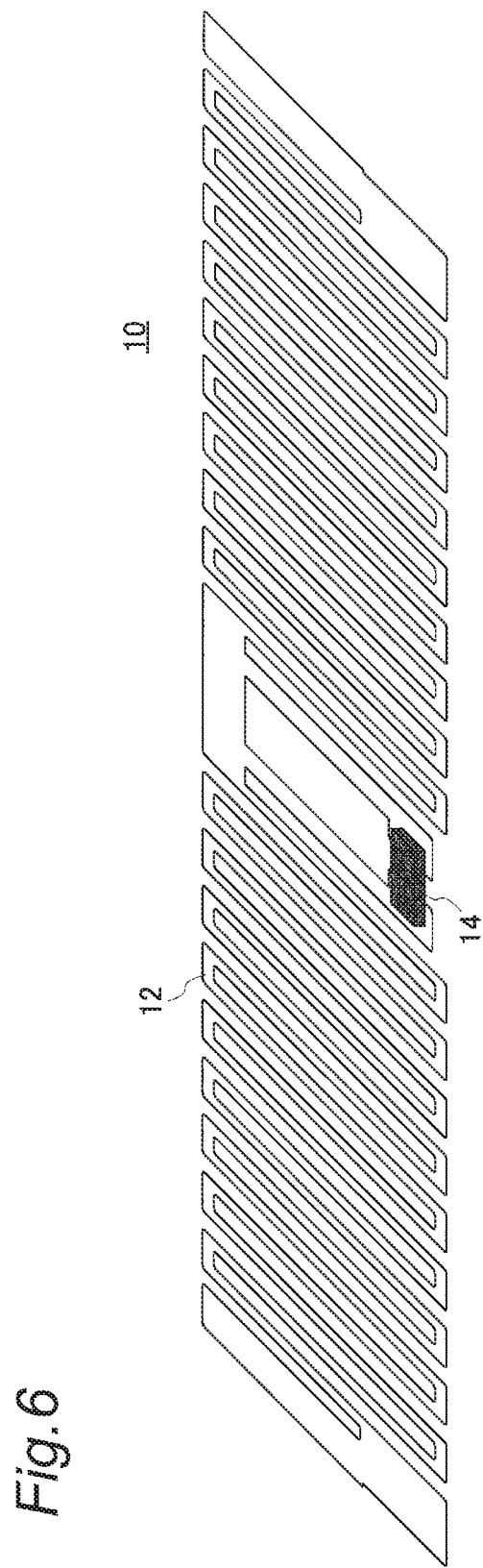

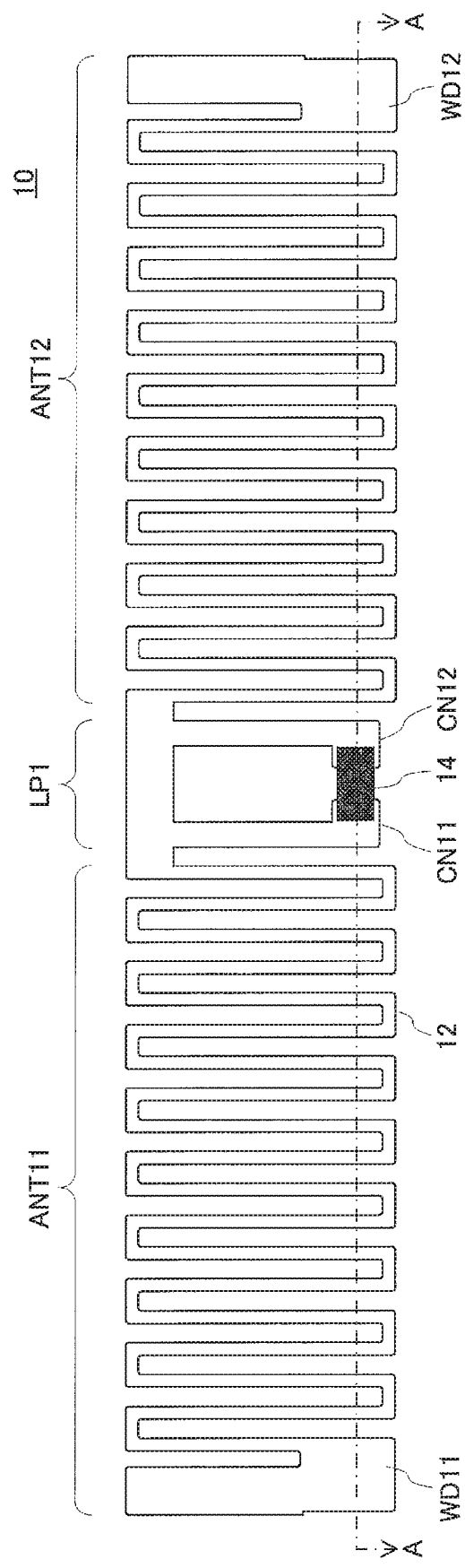
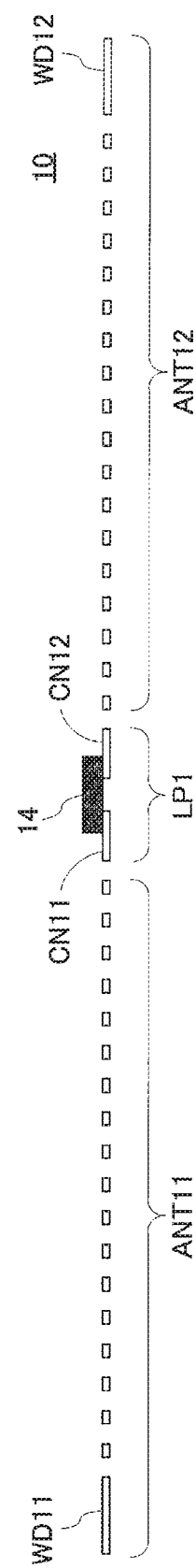
Fig. 7A
Fig. 7B

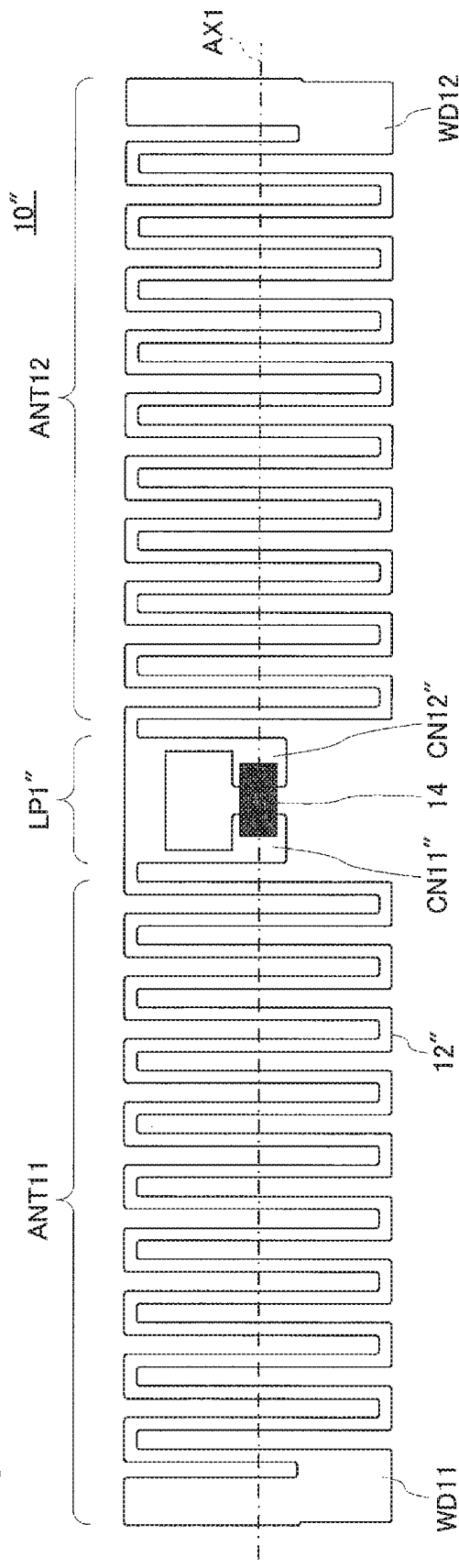
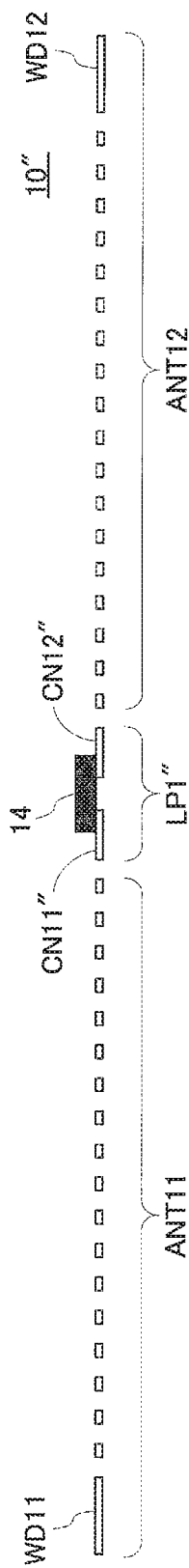
Fig. 20A
Fig. 20B

WIRELESS COMMUNICATION DEVICE AND ARTICLE WITH THE SAME ATTACHED THERETO

CROSS REFERENCE TO RELATED APPLICATIONS

This application claims the benefit of priority to Japanese Patent Application No. 2014-253749 filed on Dec. 16, 2014 and is a Continuation Application of PCT Application No. PCT/JP2015/073320 filed on Aug. 20, 2015. The entire contents of each application are hereby incorporated herein by reference.

BACKGROUND OF THE INVENTION

Field of the Invention

The present invention relates to a wireless communication device represented by an RFID (Radio Frequency Identifier) tag and, more particularly, to a wireless communication device including an antenna element including two connecting portions respectively connected to two input/output terminals provided on an RFIC (Radio Frequency Integrated Circuit) element and a linear antenna portion with both ends open and defining and functioning as a radiator. The present invention also relates to an article with such a wireless communication device attached thereto.

Description of the Related Art

For an article information management system, an RFID system is recently put to practical use and the RFID system allows a reader/writer generating an induction magnetic field and an RFID tag applied to an article to communicate in a non-contact technique utilizing an electromagnetic field so as to transmit predetermined information. This RFID tag includes an RFIC element storing predetermined information and processing a predetermined wireless signal and an antenna element transmitting/receiving high-frequency signals and the RFID tag is affixed to various articles (or packing materials thereof) to be managed when used.

The RFID system is typically an HF band RFID system using the 13 MHz band or a UHF band RFID system using the 900 MHz band. Particularly, because of a comparatively long communication distance and an ability to read multiple tags together, the UHF band RFID system is considered as a promising system for article management.

The RFID system is also recently under study for application to a laundry service, for example. The laundry service is mainly provided to the industries requiring hygiene/environmental management such as hotel, health care, nursing care, and food industries, and objects are clothes such as uniforms, linens such as towels and sheets, and shoes used in clean rooms, etc. of manufacturing factories. To manage a laundry object in a laundry work process, a provider providing this kind of laundry service uses a reader/writer to read necessary information from an RFID tag attached to the object so as to manage collection, laundering, high-temperature sterilization treatment, delivery, disposal, etc.

The laundry service provider covers the RFID tag including the RFIC element and the antenna element with a cloth label, and the cloth label is attached to the laundry object by thermocompression bonding or sewing. However, this poses a problem that if a stress is repeatedly applied to the RFID tag as the object is severely rubbed and extensively contacted and scrubbed in the laundry process, a connecting portion between the antenna element and the RFIC element becomes liable to be damaged.

Therefore, a technique of molding an RFIC element and a connecting portion of an antenna element with a resin (JP 2010-176451 A) and a technique of molding the RFIC element and the whole of the antenna element with a resin (JP 2013-47880 A) are used in some cases.

However, since the antenna element in these structures is acquired by patterning a metal foil fixed to a flexible base material sheet or a support film into a predetermined shape, i.e., by fixing different material layers, differences in flexibility, thermal expansion coefficient, etc. of materials may cause a stress to concentrate on the interface thereof in a laundry work process and may result in the peeling off of the pattern from the base material or the breaking of the pattern. Additionally, the presence of the support film may impair a drying property of an object or a permeability of a chemical agent. Moreover, a mold resin tends to increase the thickness of the tag and, therefore, when the object is clothes, tends to impair the feeling of wearing the clothes.

On the other hand, RFID tags using flexible and shape-retaining thin metallic wires are also known (JP 2005-130354 A and JP 2009-3829 A). If a flexible and shape-retaining thin metallic wire is used as the antenna element in this way, a base material sheet or a support film is not necessarily required. However, if the antenna element is formed of a thin metal wire, a stress may concentrate on a connecting portion between the RFIC element and the antenna element in the laundry work process and may cause a connection failure such as breaking of the antenna element at this portion and falling off of the RFIC element from the antenna element.

SUMMARY OF THE INVENTION

Preferred embodiments of the present invention provide a wireless communication device with a simple configuration and a high reliability capable of reducing concerns about a failure in connection between the RFIC element and the antenna element and an article with the device attached thereto.

A wireless communication device according to a first aspect of a preferred embodiment of the present invention is a wireless communication device including an RFIC element including two input/output terminals; and an antenna element including two connecting portions respectively connected to the two input/output terminals of the RFIC element and a linear antenna portion with both ends open and defining and functioning as a radiator, the antenna element being made of an elastic material, the antenna element including a loop including the two connecting portions such that in at least a portion extending parallel or substantially parallel with a straight line connecting the two connecting portions, the loop has a line width larger than the line width of the linear antenna portion.

Preferably, a line width of an entire circumference of the loop is larger than the line width of the linear antenna portion.

Preferably, the open-end portions of the linear antenna portion have a line width larger than the line width of the other portion.

Preferably, the linear antenna portion has a meander pattern extending in a direction away from the loop.

Preferably, at least a surface of the linear antenna portion is an exposed surface that is entirely exposed.

Preferably, the antenna element is acquired by a punching-out process of an elastic metal plate material.

More preferably, the metal plate material is a stainless steel material.

Preferably, the RFIC element is an RFIC package including an RFIC chip and a matching circuit including a resonance circuit connected to the RFIC chip and having a resonance frequency corresponding to a communication frequency.

Preferably, the wireless communication device is an RFID tag mounted on or attached to a laundry object.

More preferably, the wireless communication device is attached to the laundry object without a resin base material.

A wireless communication device according to a second aspect of a preferred embodiment of the present invention is a wireless communication device including an RFIC element including two input/output terminals; and an antenna element including two connecting portions respectively connected to the two input/output terminals of the RFIC element and a linear antenna portion with both ends open and defining and functioning as a radiator, the antenna element being integrally made of a material having form elasticity without having a support film bonded to the antenna element, the linear antenna portion having a meander pattern extending in a direction away from each of the two connecting portions.

An article according to the first or second aspect of a preferred embodiment of the present invention is an article to which the wireless communication device described is attached.

According to the first aspect of a preferred embodiment of the present invention, the antenna element is made of an elastic material. The antenna element has a loop including two connecting portions respectively connected to the two input/output terminals of the RFIC element such that, in at least a portion extending parallel or substantially parallel with a straight line connecting the two connecting portions, the loop has a line width larger than the line width of the linear antenna portion.

By making the width larger only in a certain portion in this way, the concern about connection failure such as breaking of the antenna element and falling off of the RFIC element due to stress (mainly twisting) is reduced without significantly impairing the electric characteristics, or increasing the size, of the wireless communication device, so that the highly-reliable wireless communication device is able to be implemented.

According to the second aspect of a preferred embodiment of the present invention, the antenna element is integrally made of a material having form elasticity without having a support film bonded to the antenna element. The linear antenna portion has a meander pattern extending in a direction away from each of the two connecting portions. Therefore, the antenna element flexibly deforms in accordance with a tensile stress and a twisting stress, so that the concern about connection failure such as falling off of the RFIC element and breaking of the antenna element is reduced.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a perspective view of an RFID tag of an example of a preferred embodiment of the present invention viewed obliquely from above.

FIG. 7A is a plan view of the RFID tag of an example of a preferred embodiment of the present invention viewed from directly above and FIG. 7B a cross-sectional view of the RFID tag shown in FIG. 7A taken along a cross-section A-A.

FIG. 20A is a plan view of an RFID tag of another example of a preferred embodiment of the present invention viewed from directly above and FIG. 20B is a cross-sectional view of a cross-section of a main portion (a cross-section along an axis AX1) of the RFID tag shown in FIG. 20A.

DETAILED DESCRIPTION OF THE PREFERRED EMBODIMENTS

Figure 1:
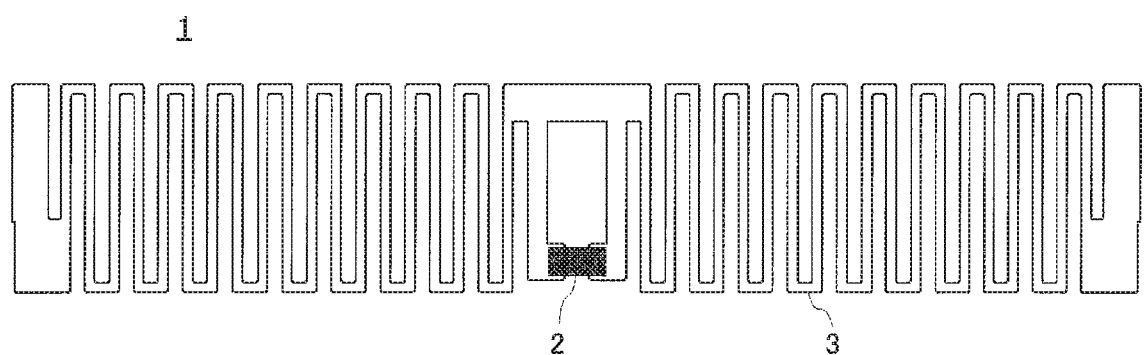
FIG. 1 is a plan view of an RFID tag of a preferred embodiment of the present invention viewed from directly above.
Figure 2:
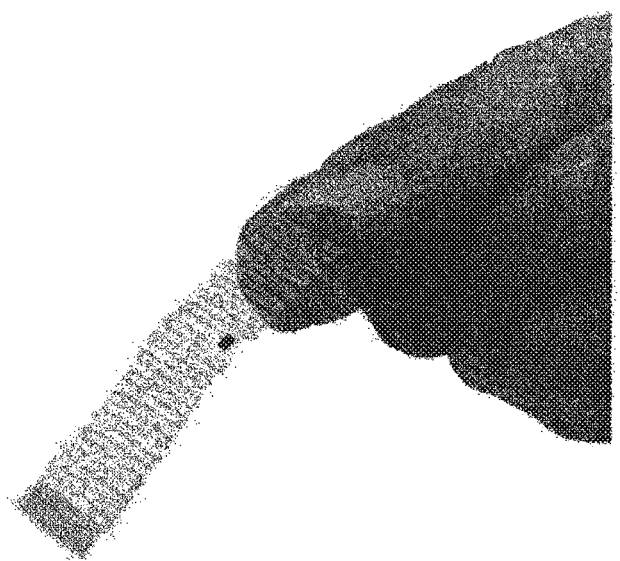
FIG. 2 is a photograph showing that an RFID tag of a preferred embodiment of the present invention has form elasticity or shape retention.
Figure 3:
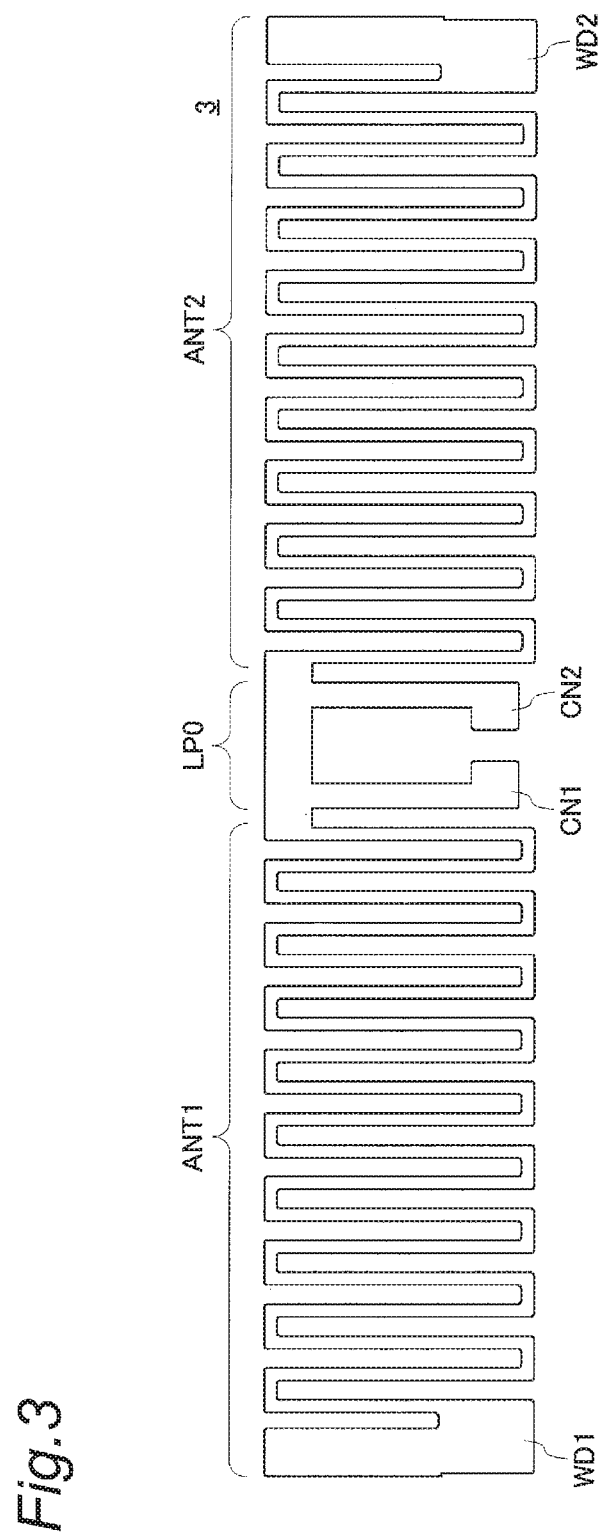
FIG. 3 is a plan view of an antenna element of a RFID tag of a preferred embodiment of the present invention viewed from directly above.

Referring to FIGS. 1, 2, and 3, a wireless communication device according to a preferred embodiment of the present invention preferably is, for example, an RFID tag 1 attached to clothes, linens, or shoes (i.e., laundry objects) so as to manage clothes such as uniforms, linens such as towels and sheets, and shoes used in clean rooms etc. of manufacturing factories, and preferably includes an RFID element 2 and a dipole antenna element 3.

As described later in detail, the RFIC element 2 is an RFIC package including an RFIC chip and a matching circuit. The matching circuit includes a resonance circuit having a resonance frequency corresponding to a communication frequency and connected to the RFIC chip. Two input/output terminals are provided on a lower surface of the RFIC element 2. None of the RFIC chip, the resonance circuit, the matching circuit, and the input/output terminals is shown.

The antenna element 3 is produced preferably by a punching-out process of a metal plate material such as a stainless steel material (e.g., SUS304) and includes linear antenna portions ANT1 and ANT2 with two open ends and defining and functioning as a radiator and a loop LP0 provided between the linear antenna portions ANT1 and ANT2 and performing impedance matching between the RFIC element 2 and the linear antenna portions ANT1, ANT2. Each of the linear antenna portions ANT1 and ANT2 has a meander pattern drawn by long sides LS and short sides SS orthogonal to each other and extending in a direction away from the loop LP0. The loop LP0 is provided with connecting portions CN1 and CN2 defining and functioning as connection terminals for the RFIC element 2. In this antenna element 3, elasticity is provided mainly by the meander-shaped linear antenna portions ANT1 and ANT2 having a relatively narrow line width.

The elasticity exhibited by the antenna element 3 is more specifically a form elasticity. Therefore, the shape of the antenna element 3 changes due to a stress and returns to an original state when the stress is released. Therefore, the antenna element 3 also has shape retention against a stress to a certain level. The short sides SS drawing the meander pattern are the sides extending in the direction away from the loop LP0.

In the antenna element 3, at least the surfaces of the linear antenna portions ANT1 and ANT2 are exposed surfaces that are entirely exposed. In other words, the RFID tag 1 does not have a resin base material fixing and holding the linear antenna portions ANT1 and ANT2, i.e., a typical support film of PET, PI, etc.

In the present preferred embodiment, the line width in the entire circumference of the loop LP0 is larger than the line width of the linear antenna portions ANT1 and ANT2. The line width of portions LV1, LV2 extending perpendicularly or substantially perpendicularly to a straight line connecting the connecting portions CN1 and CN2 of the loop LP0 is larger than the line width of the meander-shaped antenna portions ANT1 and ANT2, and the line width of portions LH0 to LH2 extending parallel or substantially parallel to the straight line connecting the connecting portions CN1 and CN2 of the loop LP0 is larger than the line width of the portions LV1, LV2.

Specifically, the line width of the portions LV1, LV2 preferably is about two to about four times as large as the line width of each of the linear antenna portions ANT1 and ANT2, and the line width of the portions LH0 to LH2 preferably is about four to about six times as large as the line width of each of the linear antenna portions ANT1 and ANT2, for example.

In each of the linear antenna portions ANT1 and ANT2, a line width of an open end portion preferably is about two to about six times as large as the line width of the other portion, for example. In particular, a wide portion WD1 is provided at the open end of the linear antenna portion ANT1, and a wide portion WD2 is provided at the open end of the linear antenna portion ANT2. By increasing the line width of the open end portions, the strength of the open end portions against twisting and bending of the tag is significantly increased.

The linear antenna portions ANT1 and ANT2 are each connected to the loop LP0 by the long side LS drawing the meander pattern. Similarly, the long side LS drawing the meander pattern reaches each of the wide portions WD1 and WD2. Connecting to the loop portion LP and each of the wide portions WD1 and WD2 by the long side LS increases the bending strength of the linear antenna portion ANT1 or ANT2 in the portion of connection to the loop LP0 or in the base portion of the wide portion WD1 or WD2 so as to reduce the concern about breaking of the linear antenna portion ANT1 or ANT2 in the laundry process because of the meander-shaped linear antenna portions ANT1 and ANT2 with a relatively narrow line width being subjected to bending and twisting.

The connecting portions CN1 and CN2 are respectively provided at one end and the other end of the loop LP0, and the RFIC element 2 is mounted on the antenna element 3 to extend between the connecting portions CN1 and CN2. In this case, the two input/output terminals of the RFIC element 2 are respectively connected to the connecting portions CN1 and CN2 by a conductive bonding material such as solder (made of Sn—Ag alloy etc.) not shown. When the RFID tag 1 produced in this way is lifted by hand, the RFID tag 1 remains only slightly bent as shown in FIG. 2 because of the form elasticity or the shape retention exhibited by the antenna element 3.

Figure 4:
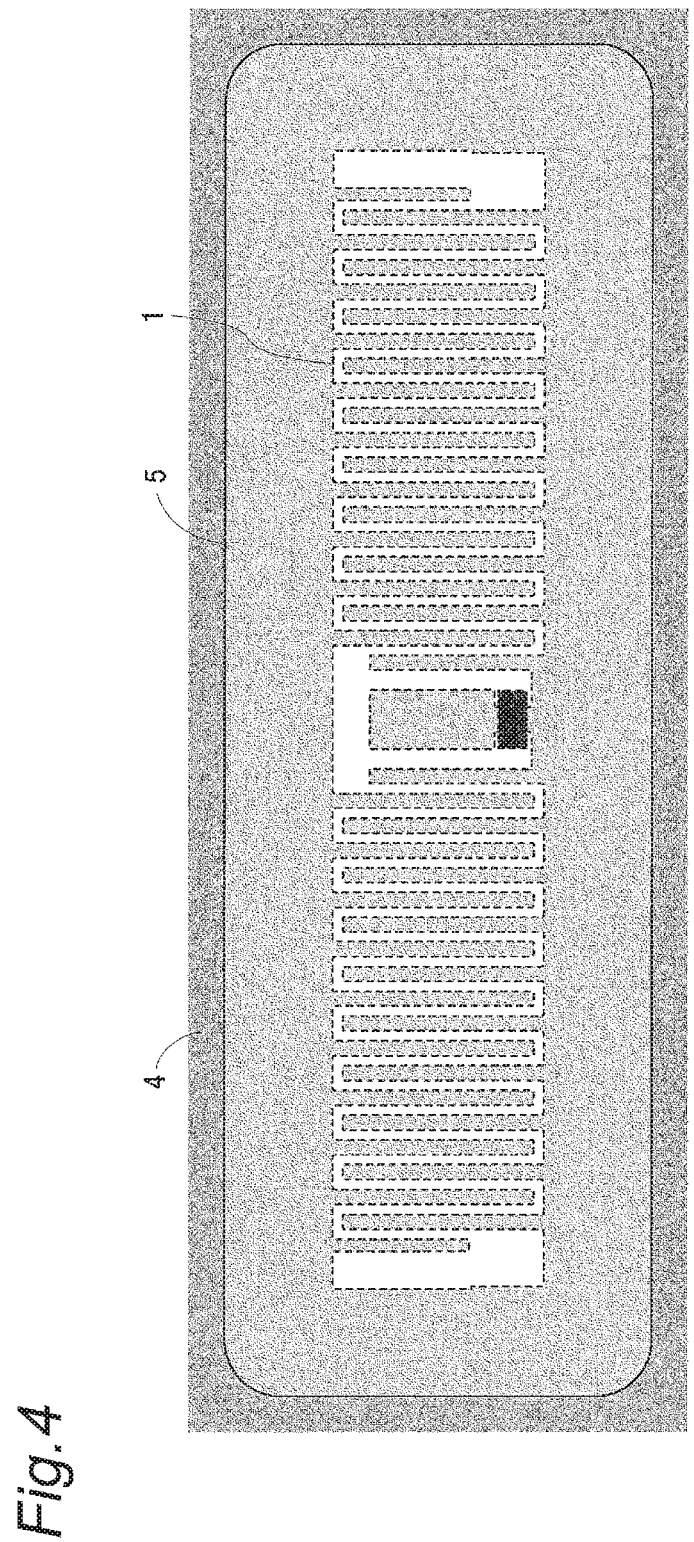
FIG. 4 is an illustrative view of an RFID tag of a preferred embodiment of the present invention attached by a patch to a laundry object.

Referring to FIG. 4, the RFID tag 1 is sealed in a state of being disposed on a flexible cloth portion of a laundry object 4 by a patch 5 made of cloth that is flexible as well. However, only an edge portion of the patch 5 is bonded or sewn onto the laundry object 4, so that a space is provided inside the edge portion of the patch 5. The RFID tag 1 freely stretches or twists within this space in accordance with stress.

As described above, by making the line width of the loop LP0 larger, providing the wide portions WD1 and WD2 at the open end of the linear antenna portion ANT1 and the open end of the linear antenna portion ANT2, respectively, and connecting the meander pattern to the loop LP0 and each of the wide portions WD1 and WD2 by the long side LS of the meander pattern, the concern about connection failure such as falling off of the RFIC element 2 and breaking of the antenna element 3 due to stress (mainly twisting) is able to be reduced without significantly impairing the electric characteristics, or increasing the size, of the RFID tag 1.

Figure 5:
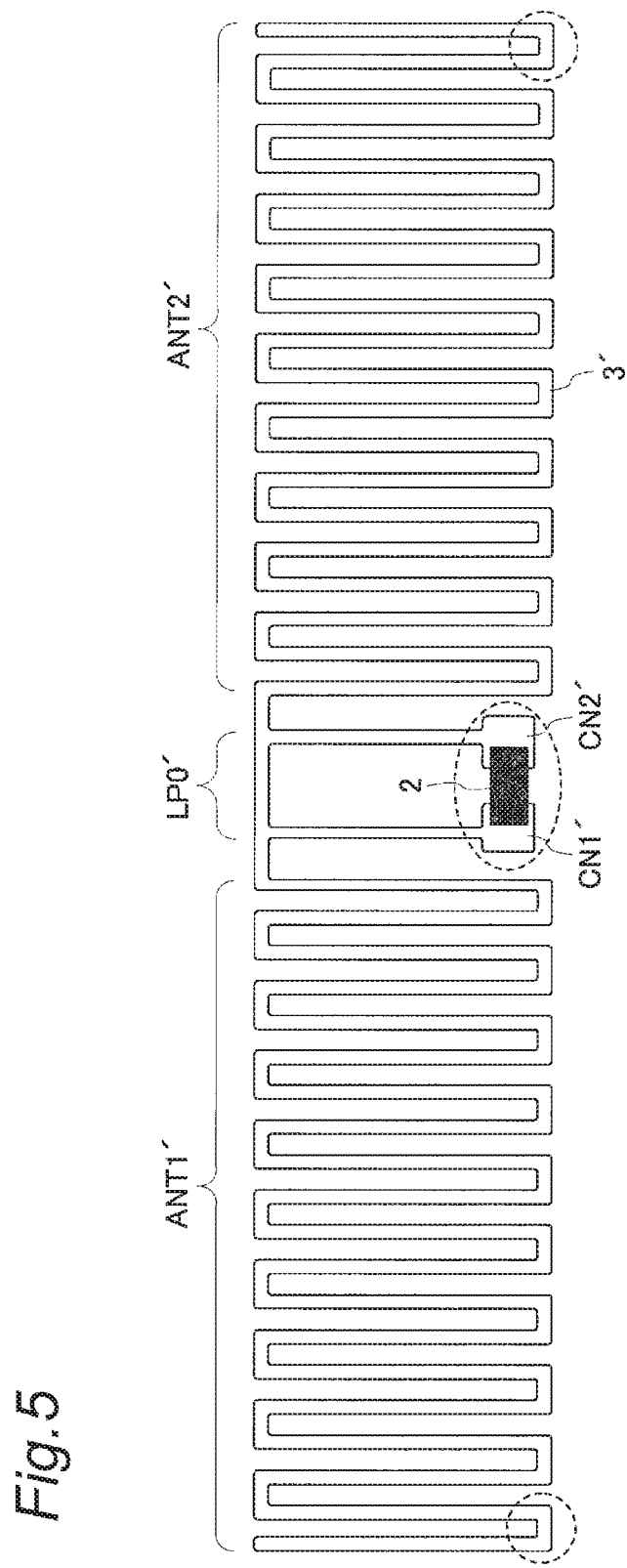
FIG. 5 is a plan view of an RFID tag having a structure different from the structure according to a first aspect of a preferred embodiment of the present invention viewed from directly above.

In particular, as shown in FIG. 5, if an antenna element 3' having the same line width entirely over the loop and the meander portion is adopted and each of linear antenna portions ANT1' and ANT2' is connected to a loop LP0' by a short side of a meander pattern, a twisting stress is applied to a tag at the time of laundry etc., and therefore, this stress is also applied to connecting portions CN1 and CN2, so that the RFIC element 2 may fall off from the connecting portions CN1' and CN2' of the antenna element 3' or, in some cases, the RFIC element 2 may crack. Additionally, an outermost portion (a portion of a circle drawn with a dotted line) of each of the linear antenna portions ANT1' and ANT2' may be broken, or may be torn off in some cases.

In this preferred embodiment, since the shapes of the loop LP0 and the linear antenna portions ANT1 to ANT2 are adjusted as described above, or particularly, the portion of the loop LP0 extending parallel or substantially parallel to the straight line connecting the two connecting portions CN1 and CN2 is made larger in line width, i.e., made harder, as compared to the line width of the linear antenna portions ANT1 and ANT2, the stress due to twisting is hardly applied to the connecting portions CN1 and CN2, so that the concern about connection failure such as falling off of the RFIC element 2 and breaking of the antenna element 3 is able to be reduced.

Furthermore, since the linear antenna portions ANT1 and ANT2 have form elasticity without having a support film fixed to the linear antenna portions and no fixing interface between different materials exists in this portion, the stress in the laundry work process hardly concentrates on the linear antenna portion ANT1 or ANT2 so that the breaking hardly occurs in the linear antenna portion ANT1 or ANT2. Additionally, since no support film supporting the antenna element 3 is used, the laundry object is not impaired in the drying property and the chemical agent permeability. Moreover, since the protection by the mold resin is not necessarily required, the RFID tag 1 is hardly increased in thickness by the mold resin so that a thin RFID tag is able to be achieved and, when the laundry object is clothes or shoes, the feeling of wearing of the clothes or shoes is hardly impaired.

In a preferred embodiment of the present invention, a support film supporting the antenna element 3 may be added. Additionally, in another preferred embodiment of the present invention, the line width of the loop LP0 may be uniform or substantially uniform over the entire circumference.

Example 1

Referring to FIG. 6 and FIGS. 7A, 7B, an RFID tag 10 of this example is a dipole RFID tag typically corresponding to the communication frequency of the 900 MHz band, i.e., the UHF band, and attached to a laundry object and includes an antenna element 12 and an RFIC element 14.

The antenna element 12 preferably is made of a stainless steel material exhibiting form elasticity with a surface subjected to a nickel tin plating treatment and includes linear antenna portions ANT11 and ANT12 including two open ends and defining and functioning as a radiator and a loop LP1 provided between the linear antenna portions ANT11 and ANT12. Each of the linear antenna portions ANT11 and ANT12 has a meander pattern drawn by long sides and short sides orthogonal to each other and extending in a direction away from the loop LP1. The short sides drawing the meander pattern are the sides extending in the direction away from the loop LP1.

Since the stainless steel material exhibits form elasticity, the shape of the antenna element 12 changes due to a stress and returns to an original state when the stress is released. Therefore, the antenna element 12 also has shape retention. In the antenna element 12, at least the surfaces of the linear antenna portions ANT11 and ANT12 are exposed surfaces that are entirely exposed. In other words, the RFID tag 10 does not have a support material fixing and holding the linear antenna portions ANT11 and ANT12.

The line width of the loop LP1 preferably is approximately three times as large as the line width of each of the linear antenna portions ANT11 and ANT12, for example. In each of the linear antenna portions ANT11 and ANT12, a line width of an open end portion preferably is approximately three times as large as the line width of the other portion, for example. In particular, a wide portion WD11 is provided at the open end of the linear antenna portion ANT11, and a wide portion WD12 is provided at the open end of the linear antenna portion ANT12. By increasing the line width of these portions, the strength against twisting and bending is able to be increased in the loop LP1 and the wide portions WD11 to WD12.

The linear antenna portions ANT11 and ANT12 are each connected to the loop LP1 by the long side drawing the meander pattern. Similarly, the long side drawing the meander pattern reaches each of the wide portions WD11 and WD12. As a result, the bending strength of the linear antenna portion ANT11 or ANT12 is able to be increased in the portion of connection to the loop LP1 or in the base portion of the wide portion WD11 or WD12 so as to reduce the concern about breaking of the linear antenna portion ANT11 or ANT12.

Figure 8:
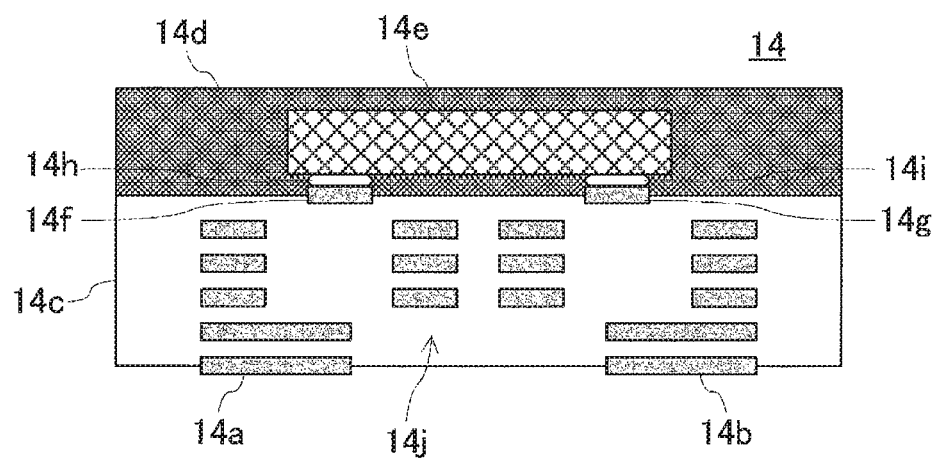
FIG. 8 is an illustrative view of an example of a structure of an RFIC element of an RFID tag of an example of a preferred embodiment of the present invention.

Referring to FIG. 8, an RFIC element 14 preferably includes an RFIC chip 14e processing an RFID signal and a matching circuit substrate 14c on which the RFIC chip 14e is mounted. The matching circuit substrate 14c preferably is made of ceramics such as LTCC in a form of a multilayer substrate. An inductor pattern defining a feeding circuit is built into the multilayer substrate. The RFIC chip 14e includes a memory circuit and a signal processing circuit built-in and is sealed with a sealing layer 14d made of an epoxy resin.

Input/output terminals 14f and 14g are provided on an upper surface of the matching circuit substrate 14c. Input/output terminals 14h and 14i are provided on a lower surface of the RFIC chip 14e. The input/output terminals 14f and 14g are respectively connected to the input/output terminals 14h and 14i by a conductive bonding material (made of Ag etc.) not shown. The input/output terminals 14f and 14g are connected through a matching circuit 14j (see FIG. 9) provided on the matching circuit substrate 14c to input/output terminals 14a and 14b, respectively, provided on a lower surface of the RFIC element 14.

An equivalent circuit of the RFIC element 14 as described above is shown in FIG. 9. One end of an inductor L1 and one end of an inductor L2 are respectively connected to the input/output terminals 14f and 14g. The other end of the inductor L1 is connected to one end of an inductor L3, and the other end of the inductor L2 is connected to one end of an inductor L4. The other end of the inductor L3 is connected to the other end of the inductor L4. The input/output terminal 14a is connected to a connection point of the inductors L1 and L3, and the input/output terminal 14b is connected to a connection point of the inductors L2 and L4.

As can be seen from this equivalent circuit, the inductors L1 to L4 are wound to generate magnetic fields in phase and are connected in series to each other. Therefore, the inductors L1 and L3 are magnetically and capacitively coupled, and the inductors L2 and L4 are magnetically and capacitively coupled. The characteristics of impedance matching by the matching circuit 14j are regulated by the values of the inductors L1 to L4.

A substrate on which the RFIC element is mounted may be a rigid resin substrate of epoxy etc. or a flexible resin substrate of PI etc., and is preferably a ceramic substrate as described above. In particular, by producing the RFIC element as a ceramic package product, the RFIC element is improved in heat resistance and robustness, and the reliability of the RFID tag is able to be maintained even when the tag is twisted or bent in the laundry process.

Returning to FIGS. 7A and 7B, connecting portions CN11 and CN12 are respectively provided at one end and the other end of the loop LP1. The RFIC element 14 is mounted on the antenna element 12 to extend between the connecting portions CN11 and CN12. In this case, the two input/output terminals 14a and 14b of the RFIC element 14 are respectively connected to the connecting portions CN11 and CN12 by a conductive bonding material (made of Ag etc.) not shown. As a result, the inductors L1 to L4 provided in the matching circuit 14j define a resonance circuit together with the loop LP1. This resonance circuit resonates at the communication frequency, i.e., in the UHF band.

Figure 10C:
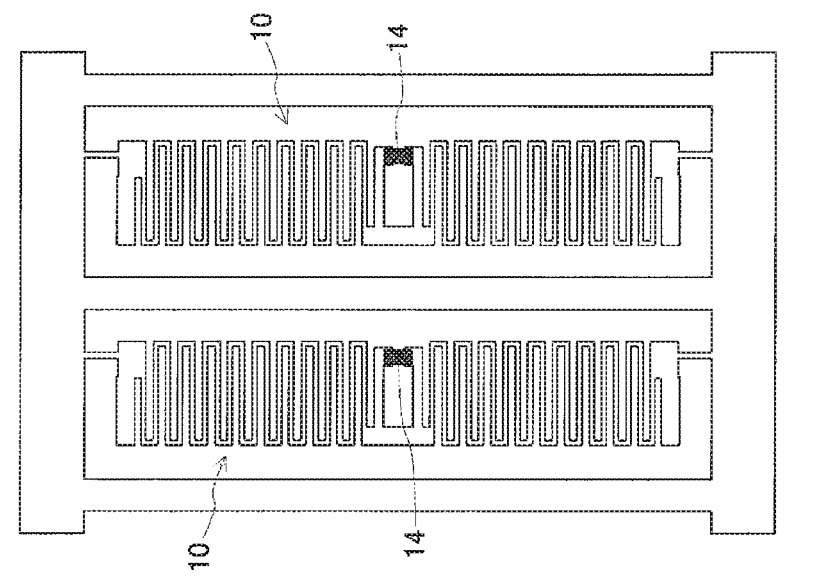
FIG. 10C is an illustrative view of a further portion of the manufacturing process of the RFID tag of this example.
Figure 10B:
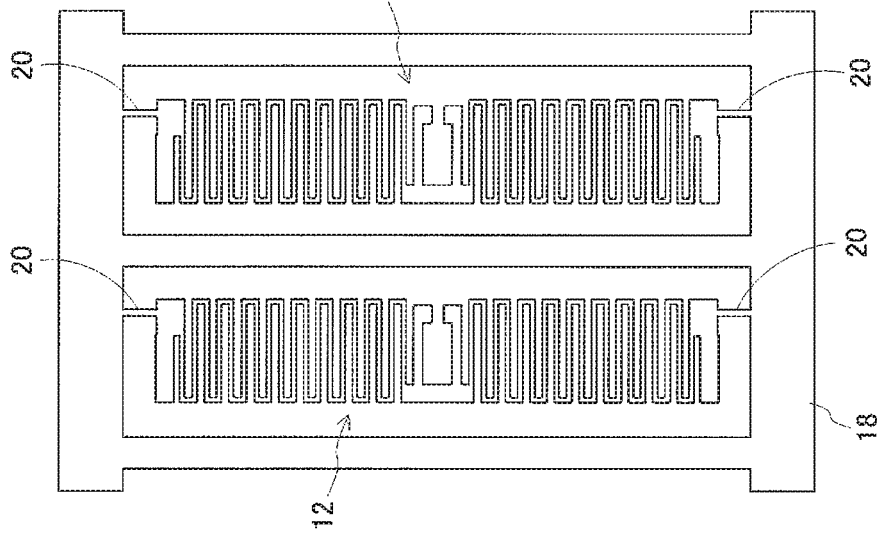
FIG. 10B is an illustrative view of another portion of the manufacturing process of the RFID tag of this example.
Figure 10A:
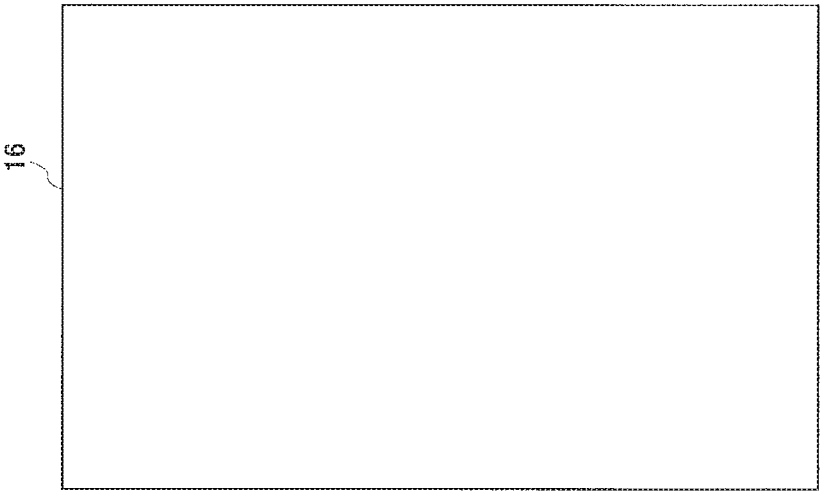
FIG. 10A is an illustrative view of a portion of a manufacturing process of an RFID tag of an example of a preferred embodiment of the present invention.

A non-limiting example of a method of manufacturing the RFID tag 10 will be described with reference to FIGS. 10A to 10C. First, a metal plate material 16 is prepared, and the metal plate material 16 is punched out by a punching process. A plate material remaining after the punching-out process includes the two antenna elements 12, 12, one frame 18, and bars 20, 20 leading from open ends of each of the antenna elements 12 to the frame 18. Additionally, a groove for cutting is provided at each of boundaries between the antenna elements 12 and the bars 20. Subsequently, the RFIC element 14 is mounted on each of the antenna elements 12, and the antenna elements 12 are cut off at the groove portions. As a result, the two RFID tags 10, 10 are acquired from the one metal plate material 16.

The laundry service is mainly provided to the industries requiring hygiene/environmental management such as hotel, health care, nursing care, and food industries. Laundry objects are assumed to be clothes such as uniforms, linens such as towels and sheets, and shoes used in clean rooms, etc. of manufacturing factories. To manage a laundry object in a laundry work process, the RFID tag 10 is attached to the laundry object. Tag information is read by a reader/writer and utilized for management of collection, laundering, high-temperature sterilization treatment, delivery, disposal, etc. For such management, the RFID tag 10 is attached to the laundry object in the following manner (clothes are assumed as the laundry object in this case).

Usage Example 1

Figure 11:
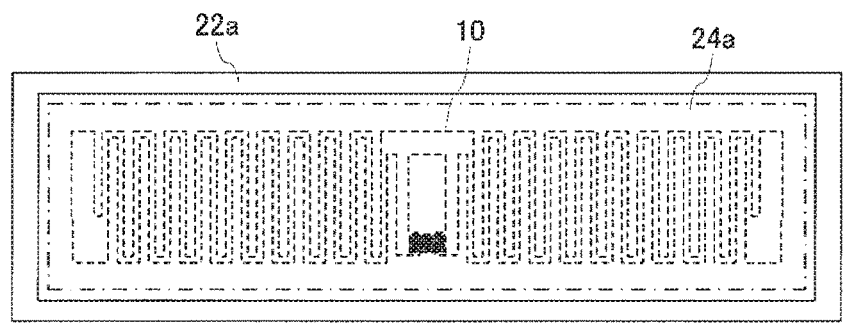
FIG. 11 is an illustrative view of an RFID tag of an example of a preferred embodiment of the present invention attached by a patch to a brand tag.

Referring to FIG. 11, the RFID tag 10 is sealed by a patch 24a made of cloth in a state of being disposed on a brand tag 22a made of cloth. In this state, the patch 24a is sewn onto the brand tag 22a made of cloth by sewing (a sewing thread is represented by a dashed-dotted line surrounding the RFID tag 10) or is affixed onto the brand tag 22a by thermocompression bonding applied to an edge portion of the patch 24a. As a result, a space is provided inside the edge portion of the patch 24a. The RFID tag 10 is enclosed in this space and freely stretches or twists in accordance with stress.

Figure 12:
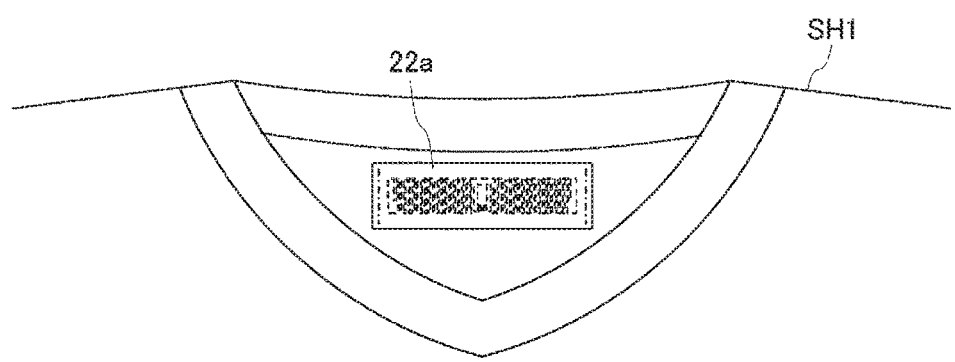
FIG. 12 is an illustrative view showing a main portion of a shirt on which the brand tag shown in FIG. 11 is sewn.

The brand tag 22a with the RFID tag 10 sealed as described above is attached to a neck of a shirt SH1 that is a suit of clothes as in a manner shown in FIG. 12. In particular, the brand tag 22a is sewn onto the shirt SH1 by sewing (sewing threads are represented by dashed-dotted lines extending in the vertical direction at left and right ends of the brand tag 22a). In the sewn state, the RFIC element 14 protrudes toward the back of the shirt SH1.

Usage Example 2

Figure 13:
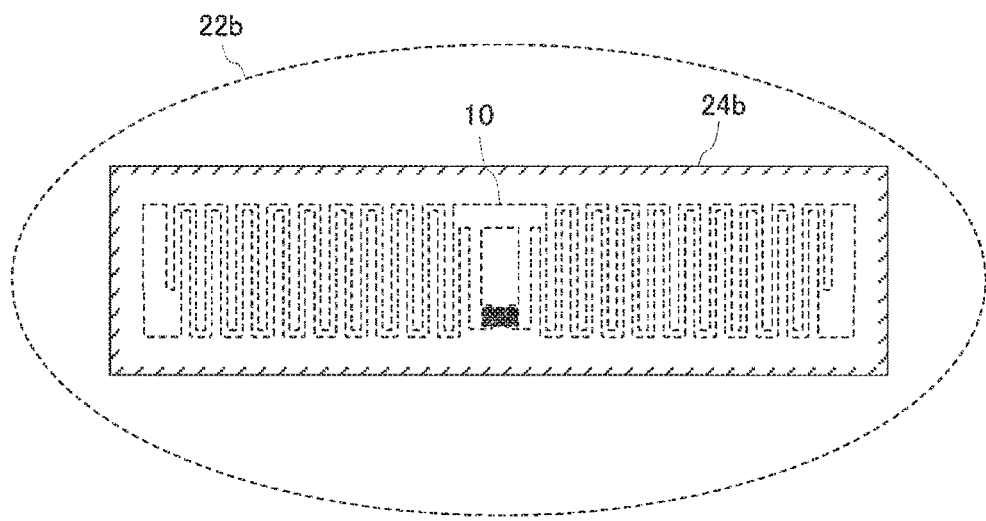
FIG. 13 is an illustrative view of an RFID tag of an example of a preferred embodiment of the present invention attached by a patch to a cloth.

Referring to FIG. 13, the RFID tag 10 is also sealed by a patch 24b made of cloth in a state of being disposed on a cloth 22b constituting an arbitrary portion of clothes. In this state, the patch 24b is affixed to the cloth 22b by thermocompression bonding (a thermocompression bonding portion is represented by hatching drawn on an edge portion of the patch 24b) or is sewn onto the cloth 22b by sewing on an edge portion of the patch 24b. As a result, a space is provided inside the edge portion of the patch 24b. The RFID tag 10 is enclosed in this space and freely stretches or twists in accordance with stress.

Usage Example 3

Figure 14:
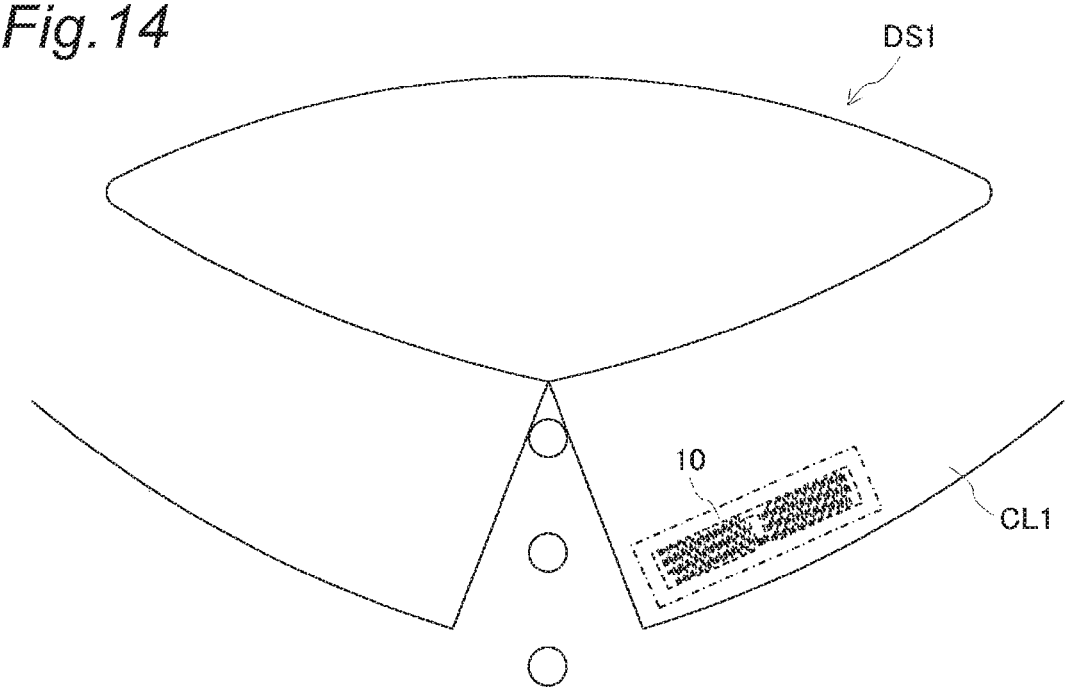
FIG. 14 is an illustrative view of an RFID tag of an example of a preferred embodiment of the present invention attached to a collar of a dress shirt.

Referring to FIG. 14, the RFID tag 10 may be embedded in a tip of a collar CL1 provided in a dress shirt DS1. Specifically, the collar CL1 includes two overlapped pieces of cloth, and the RFID tag 10 is embedded between the two pieces of cloth. A sewing thread is sewn around the embedded RFID tag 10 with a certain margin (the sewing thread is represented by a dashed-dotted line surrounding the RFID tag 10). As a result, the RFID tag 10 is sealed in the tip of the collar CL1.

It is noted that clothes such as a dress shirt also have cuffs each made up of two overlapped pieces of cloth. Therefore, the RFID tag 10 may be embedded between the two pieces of cloth of a cuff. The RFID tag 10 is also attached to linens such as towels and sheets used in hotels and hospitals as well as shoes used in clean rooms of manufacturing factories in the manner described above.

As can be seen from the above description, the RFIC element 14 has the input/output terminals 14a and 14b. The antenna element 12 is made of an elastic material and includes the connecting portions CN11 and CN12 respectively connected to the input/output terminals 14a and 14b, the loop LP1 including the connecting portions CN11 and CN12, and the linear antenna portions ANT11 and ANT12 with two open ends and defining and functioning as a radiator. The line width of the loop LP1 is larger than the line width of each antenna portion of the linear antenna portions ANT11 and ANT12.

By making the width larger only in a certain portion in this way, the concern about connection failure such as breaking of the antenna element 12 and falling off of the RFIC element 14 due to stress (mainly twisting) is able to be reduced without significantly impairing the electric characteristics, or increasing the size, of the RFID tag 10.

Modification Example of RFIC Element

In this example, the RFIC element 14 including the structure shown in FIG. 8 is mounted on the antenna element 12. However, an RFIC element 26 including a structure shown in FIGS. 15, 16, 17A, 17B, and 18A to 18C may be mounted on the antenna element 12 instead of the RFIC element 14.

Figure 15:
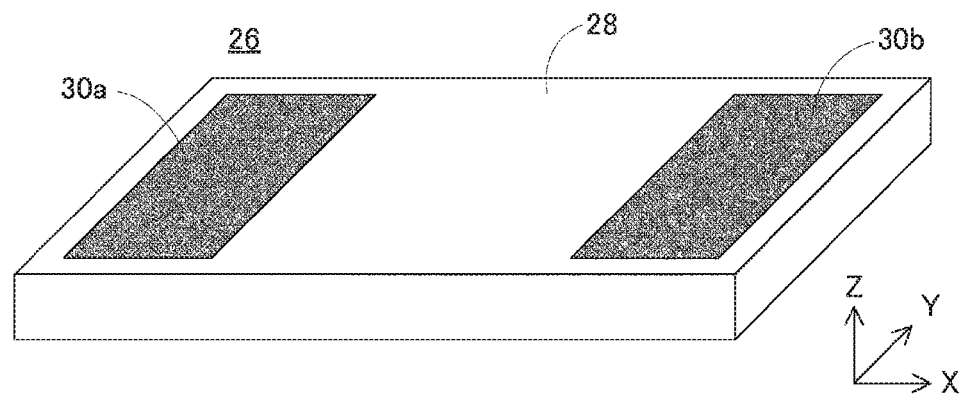
FIG. 15 is a perspective view of another example of an RFIC element of an RFID tag of an example of a preferred embodiment of the present invention.

Referring to FIG. 15, the RFIC element 26 is also an RFIC element corresponding to the communication frequency of the UHF band and has a multilayer substrate 28 with a principal surface defining a rectangle or an approximate rectangle. The multilayer substrate 28 includes a base body that is a laminated body acquired by laminating flexible resin insulating layers of polyimide, liquid crystal polymer, etc., and the multilayer substrate 28 itself exhibits flexibility. Insulating layers 28a to 28c (see FIG. 18) made of these materials have the permittivity smaller than that of a ceramic base material layer represented by LTCC (Low Temperature Co-fired Ceramics).

In this case, the X-axis is assigned to a longitudinal direction of the multilayer substrate 28, the Y-axis is assigned to a width direction of the multilayer substrate 28, and the Z-axis is assigned to a thickness direction of the multilayer substrate 28.

Figure 16:
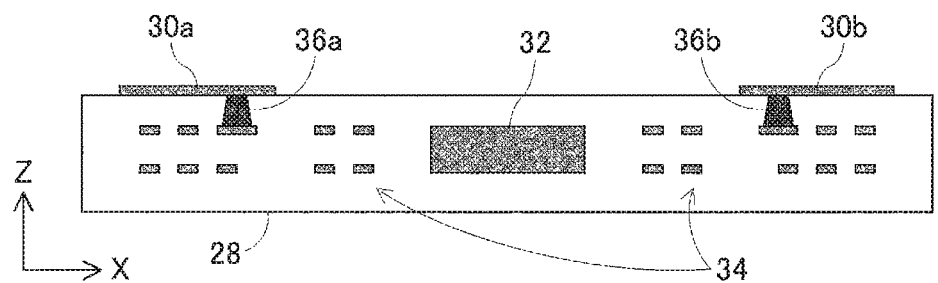
FIG. 16 is an illustrative view of an example of the structure of the RFIC element shown in FIG. 15.
Figure 17A:
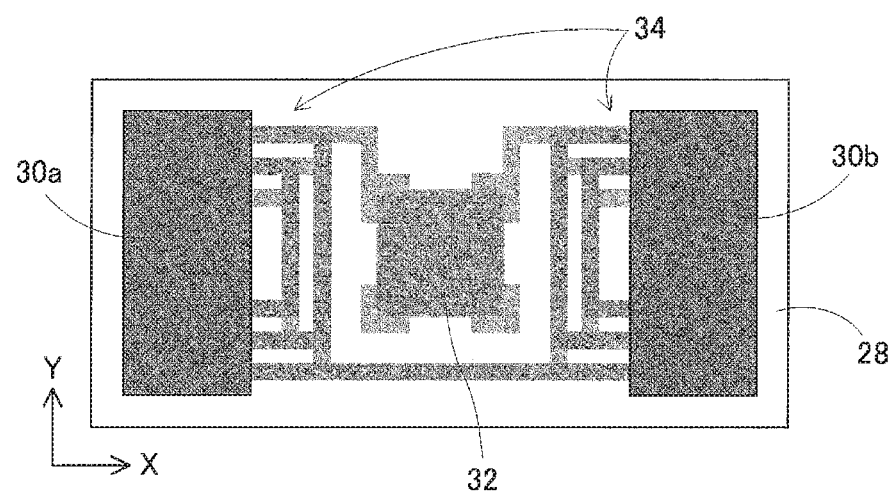
FIG. 17A is a top view of the RFIC element shown in FIG. 15 viewed from directly above and FIG. 17B is a bottom view of the RFIC element shown in FIG. 15 viewed from directly below.
Figure 17B:
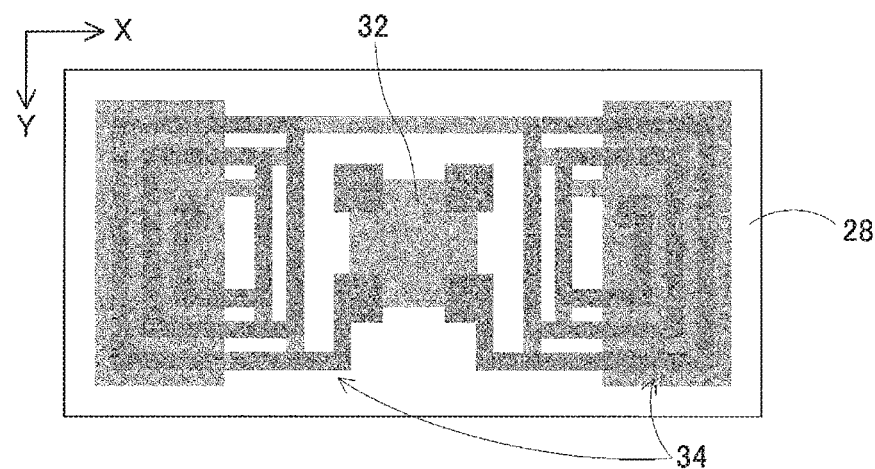

Further referring to FIGS. 16, 17A, and 17B, an RFIC chip 32 and a matching circuit 34 are built into the multilayer substrate 28, and an input/output terminals 30a and 30b are provided on one principal surface of the multilayer substrate 28.

Specifically, the RFIC chip 32 has a structure in which various elements are built into a hard semiconductor substrate made of a semiconductor such as silicon and includes the one principal surface and the other principal surface defining a square or an approximate square. Input/output terminals 32a and 32b are provided on the other principal surface of the RFIC chip 32 (described in detail later). The RFIC chip 32 is located at the center in each of the X-, Y-, and Z-axis directions inside the multilayer substrate 28 in a posture in which the sides of the square or approximate square extend along the X-axis or the Y-axis and the one principal surface and the other principal surface face the positive side and the negative side, respectively, in the Z-axis direction.

A portion of the matching circuit 34 (coil portions CIL1, CIL3, an interlayer connection conductor 38a described later) is disposed at a position on the negative side in the X-axis direction and a center position in the Z-axis direction, and another portion of the matching circuit 34 (coil portions CIL2, CIL4, an interlayer connection conductor 38b described later) is disposed at a position on the positive side in the X-axis direction and a center position in the Z-axis direction.

Therefore, when the multilayer substrate 28 is viewed in each of the Z- and Y-axis directions, the RFIC chip 32 is located between the coil portions CIL1 and CIL2 as well as between the coil portions CIL3 and CIL4.

The input/output terminal 30a is disposed at a position on the negative side in the X-axis direction, and the input/output terminal 30b is disposed at a position on the positive side in the X-axis direction. Both the input/output terminals 30a and 30b are made of flexible copper foil and are strip-shaped and have the respective principal surface sizes identical or substantially identical to each other. The short sides of the strip extend along the X-axis, and the long sides of the strip extend along the Y-axis.

Therefore, in a planar view of the multilayer substrate 28 in the Z-axis direction, the RFIC chip 32 is interposed between a portion of the matching circuit 34 and another portion of the matching circuit 34. When the multilayer substrate 28 is viewed in the X-axis direction, the RFIC chip 32 overlaps with the matching circuit 34. In the planar view of the multilayer substrate 28 in the Z-axis direction, the matching circuit 34 partially overlaps with each of the input/output terminals 30a and 30b.

Since each of the insulating layers 28a to 28c (see FIG. 18) of the multilayer substrate 28 is as thin as about 10 μm to about 100 μm, the RFIC chip 32 and the matching circuit 34 built into the multilayer substrate 28 can be seen through on the outside. Therefore, the connection state (presence of breaking) of the RFIC chip 32 and the matching circuit 34 is easily confirmed.

Figure 18A:
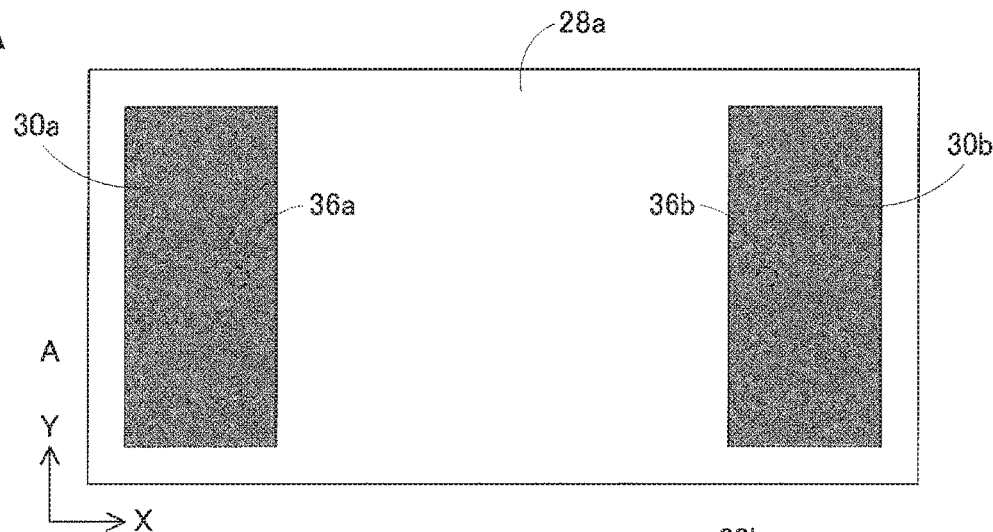
FIG. 18A is a top view of an upper insulating layer of a multilayer substrate of the RFIC element viewed from directly above, FIG. 18B a top view of an intermediate insulating layer of the multilayer substrate of the RFIC element viewed from directly above.
Figure 18B:
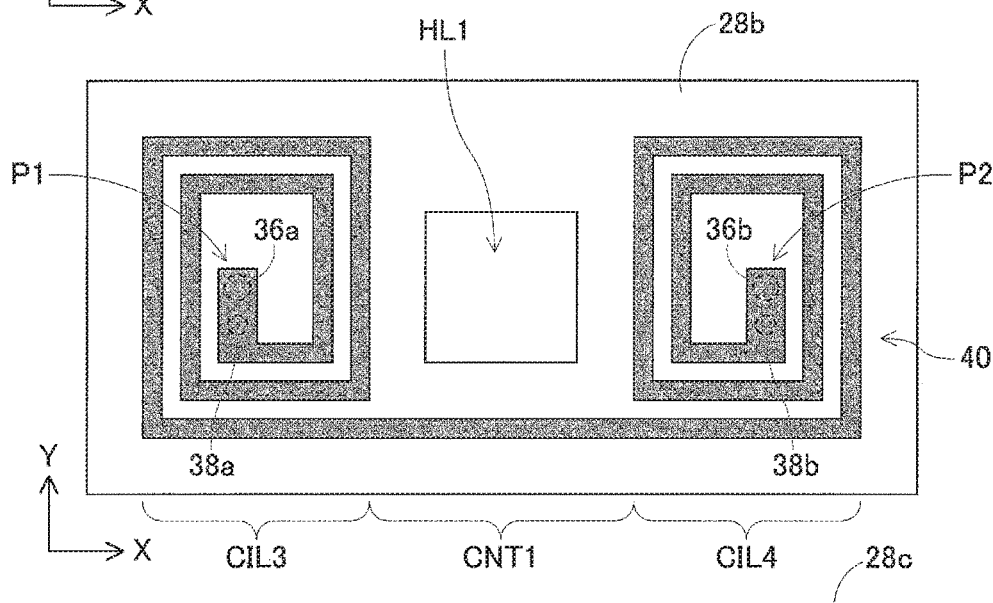
FIG. 18C is a top view of a lower insulating layer of the multilayer substrate of the RFIC element viewed from directly above.
Figure 18C:
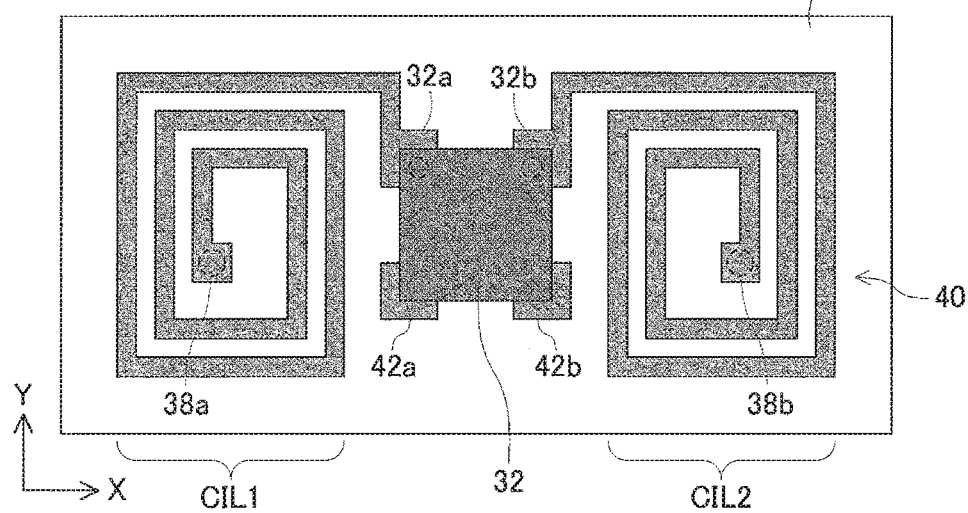

Referring to FIGS. 18A to 18C, the multilayer substrate 28 preferably includes three laminated sheet-shaped insulating layers 28a to 28c. Among these layers, the insulating layer 28a defines an upper layer, the insulating layer 28b defines an intermediate layer, and the insulating layer 28c defines a lower layer.

The input/output terminals 30a and 30b are provided on one principal surface of the insulating layer 28a. As described above, the input/output terminal 30a is disposed on the negative side in the X-axis direction and the input/output terminal 30b is disposed on the positive side in the X-axis direction.

At the center position of one principal surface of the insulating layer 28b, a rectangular or substantially rectangular through-hole HL1 is provided, reaching the other principal surface. The size of the through-hole HL1 is matched to the size of the RFIC chip 32. A portion of a coil conductor 40 made of flexible copper foil and extending in a belt shape extends around the through-hole HL1 on the one principal surface of the insulating layer 28b. The portion of the coil conductor 40 is defined by connecting the coil portions CIL3 and CIL4 to each other by a connecting portion CNT1.

One end of the coil portion CIL3 is disposed at a position overlapping with the input/output terminal 30a in the planar view and is connected to the input/output terminal 30a by an interlayer connection conductor 36a extending in the Z-axis direction. One end of the coil portion CIL4 is disposed at a position overlapping with the input/output terminal 30b in the planar view and is connected to the input/output terminal 30b by an interlayer connection conductor 36b extending in the Z-axis direction. The interlayer connection conductors 36a, 36b and the interlayer connection conductors 38a, 38b described later are hard metal bulks containing Sn as a main component.

Assuming that the one end of the coil portion CIL3 is a starting end, the coil portion CIL3 extends around the one end twice in the counterclockwise direction, extends to near the end portion of the negative side in the Y-axis direction, and then extends into the positive side in the X-axis direction. The extending coil portion CIL3 reaches one end of the connecting portion CNT1 extending along the X-axis through a position on the negative side in the Y-axis direction.

Assuming that the one end of the coil portion CIL4 is a starting end, the coil portion CIL4 extends around the one end twice in the counterclockwise direction, extends to near the end portion of the negative side in the Y-axis direction, and then extends into the negative side in the X-axis direction. The extending coil portion CIL4 reaches the other end of the connecting portion CNT1.

The coil portions CIL1 and CIL2 are another portion of the coil conductor 40 and provided on one principal surface of the insulating layer 28c. In a planar view of the insulating layers 28b and 28c, one end of the coil portion CIL1 is disposed at a position somewhat on the negative side in the Y-axis direction as compared to the one end of the coil portion CIL3, and the other end of the coil portion CIL1 is disposed at a position overlapping with a corner on the negative side in the X-axis direction and the positive side in the Y-axis direction out of the four corners of the rectangle drawn by the through-hole HL1.

One end of the coil portion CIL2 is disposed at a position somewhat on the negative side in the Y-axis direction as compared to the one end of the coil portion CIL4, and the other end of the coil portion CIL2 is disposed at a position overlapping with a corner on the positive side in the X-axis direction and the positive side in the Y-axis direction out of the four corners of the rectangle drawn by the through-hole HL1. Both the other end of the coil portion CIL1 and the other end of the coil portion CIL2 are rectangular or substantially rectangular in the planar view of the insulating layer 28c.

Assuming that the one end of the coil portion CIL1 is a starting point, the coil portion CIL1 extends around the one end about 2.5 times in the clockwise direction and subsequently bends toward the negative side in the Y-axis direction to reach the other end. Similarly, assuming that the one end of the coil portion CIL2 is a starting point, the coil portion CIL2 extends around the one end about 2.5 times in the counterclockwise direction and subsequently bends toward the negative side in the Y-axis direction to reach the other end. The one end of the coil portion CIL1 is connected to the one end of the coil portion CIL3 by the interlayer connection conductor 38a extending in the Z-axis direction, and the one end of the coil portion CIL2 is connected to the other end of the coil portion CIL4 by the interlayer connection conductor 38b extending in the Z-axis direction.

In the planar view of the insulating layers 28b and 28c, the coil portion CIL1 overlaps with the coil portion CIL3, and the coil portion CIL2 overlaps with the coil portion CIL4. The matching circuit 34 includes the coil portions CIL1 to CIL4 arranged in this way as well as the interlayer connection conductors 38a and 38b.

Rectangular or substantially rectangular dummy conductors 42a and 42b made of flexible copper foil are also provided on the one principal surface of the insulating layer 28c. In the planar view of the insulating layers 28b and 28c, the dummy conductors 42a and 42b are disposed to overlap with two respective corners arranged in the X-axis direction on the negative side in the Y-axis direction out of the four corners of the rectangle defined by the through-hole HL1.

The RFIC chip 32 is mounted on the insulating layer 28c such that the four corners of the other principal surface respectively face the other end of the coil portion CIL1, the other end of the coil portion CIL2, and the dummy conductors 42a, 42b. The input/output terminal 32a is disposed on the other principal surface of the RFIC chip 32 to overlap with the other end of the coil portion CIL1 in the planar view. Similarly, the input/output terminal 32b is disposed on the other principal surface of the RFIC chip 32 to overlap with the other end of the coil portion CIL2 in the planar view. As a result, the RFIC chip 32 is connected to the other end of the coil portion CIL1 by the input/output terminal 32a and is connected to the other end of the coil portion CIL2 by the input/output terminal 32b.

Figure 9:
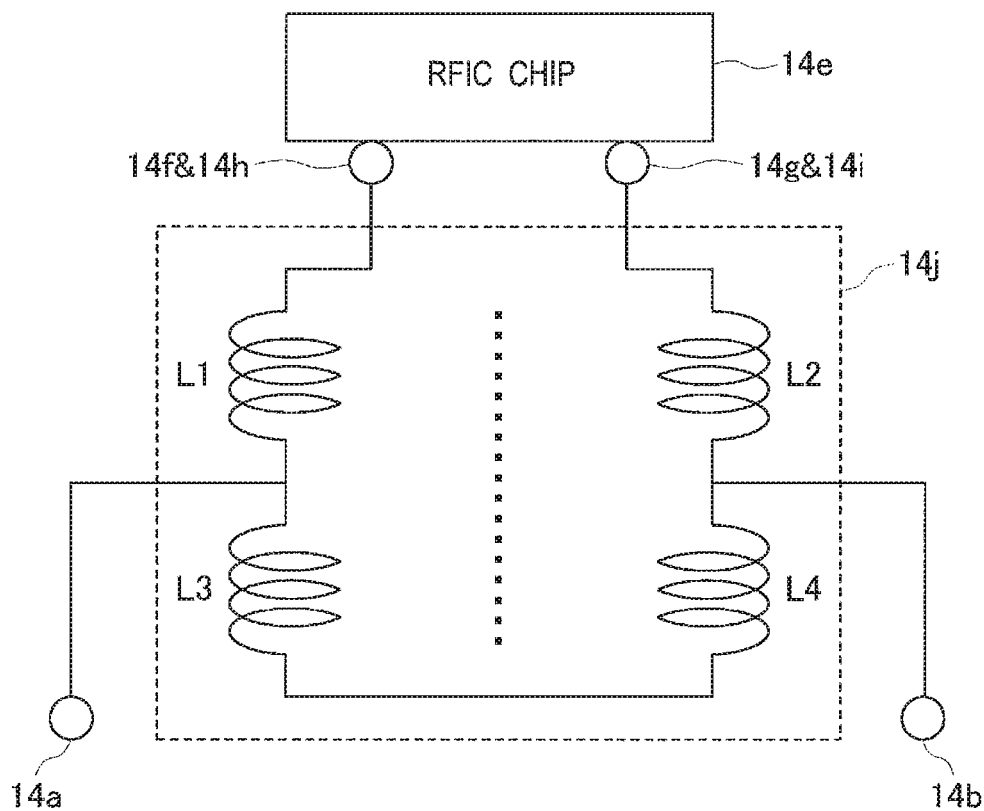
FIG. 9 is a circuit diagram of an equivalent circuit of the RFIC element shown in FIG. 8.

An equivalent circuit of the RFIC element 26 as described above is similar to the equivalent circuit shown in FIG. 9. In this case, the coil portion CIL1 corresponds to the inductor L1; the coil portion CIL2 corresponds to the inductor L2; coil portion CIL3 corresponds to the inductor L3; and the coil portion CIL4 corresponds to the inductor L4.

The RFIC element 26 as described above exhibits flexibility and therefore reduces the concern about falling off of the RFIC element 26 from the antenna element 12, cracking of the RFIC element 26, etc.

Modification Example of Antenna Element

Figure 19:
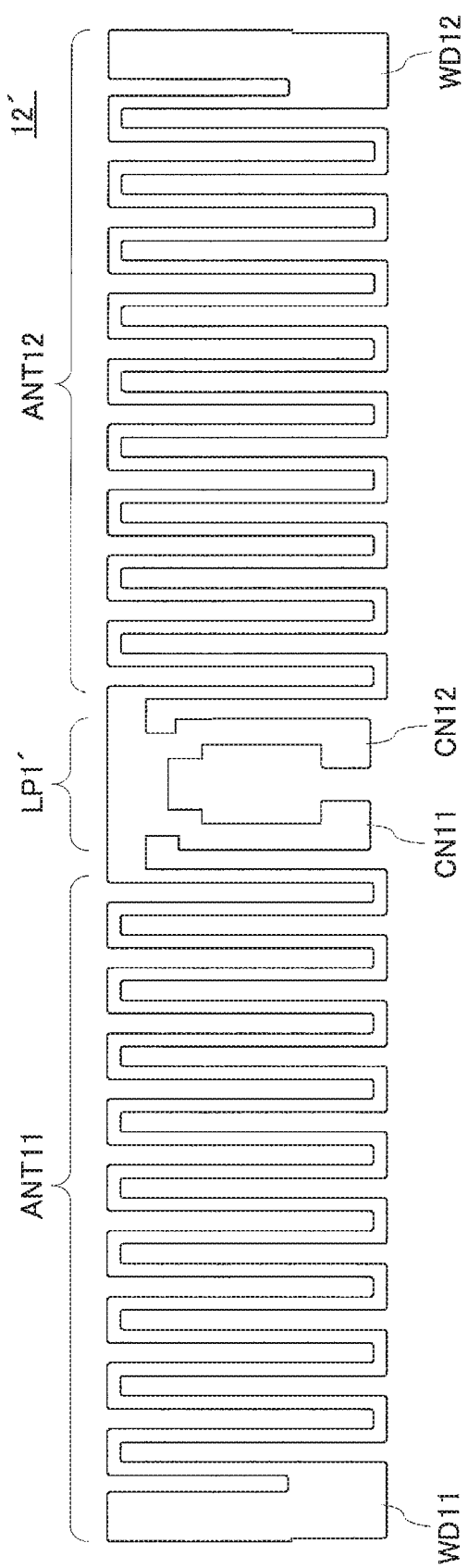
FIG. 19 is a plan view of another example of an antenna element of the RFID tag of an example of a preferred embodiment of the present invention.

In the example described above, the antenna element 12 having the shape shown in FIGS. 7A and 7B preferably is adopted. However, an antenna element 12' shown in FIG. 19 may be adopted instead. The antenna element 12' is the same as the antenna element 12 except that a loop LP1' is slightly different in shape from the loop LP1.

Example 2

Referring to FIGS. 20A and 20B, an RFID tag 10" of this example includes an antenna element 12" instead of the antenna element 12. The antenna element 12" is the same as the antenna element 12 except that a loop LP1" is different in shape from the loop LP1. Therefore, the loop LP1" will not hereinafter be described except the shape thereof as far as possible.

Assuming that an axis AX1 extends through the center positions of the long sides of the meander pattern defined by the linear antenna portions ANT11 and ANT12 along the short sides of the meander pattern, the shape of the loop LP1" hardly transmits a stress corresponding to twisting to the RFIC element 14 when the antenna element 12" is twisted in a rotation direction of the axis AX1.

Figure 21:
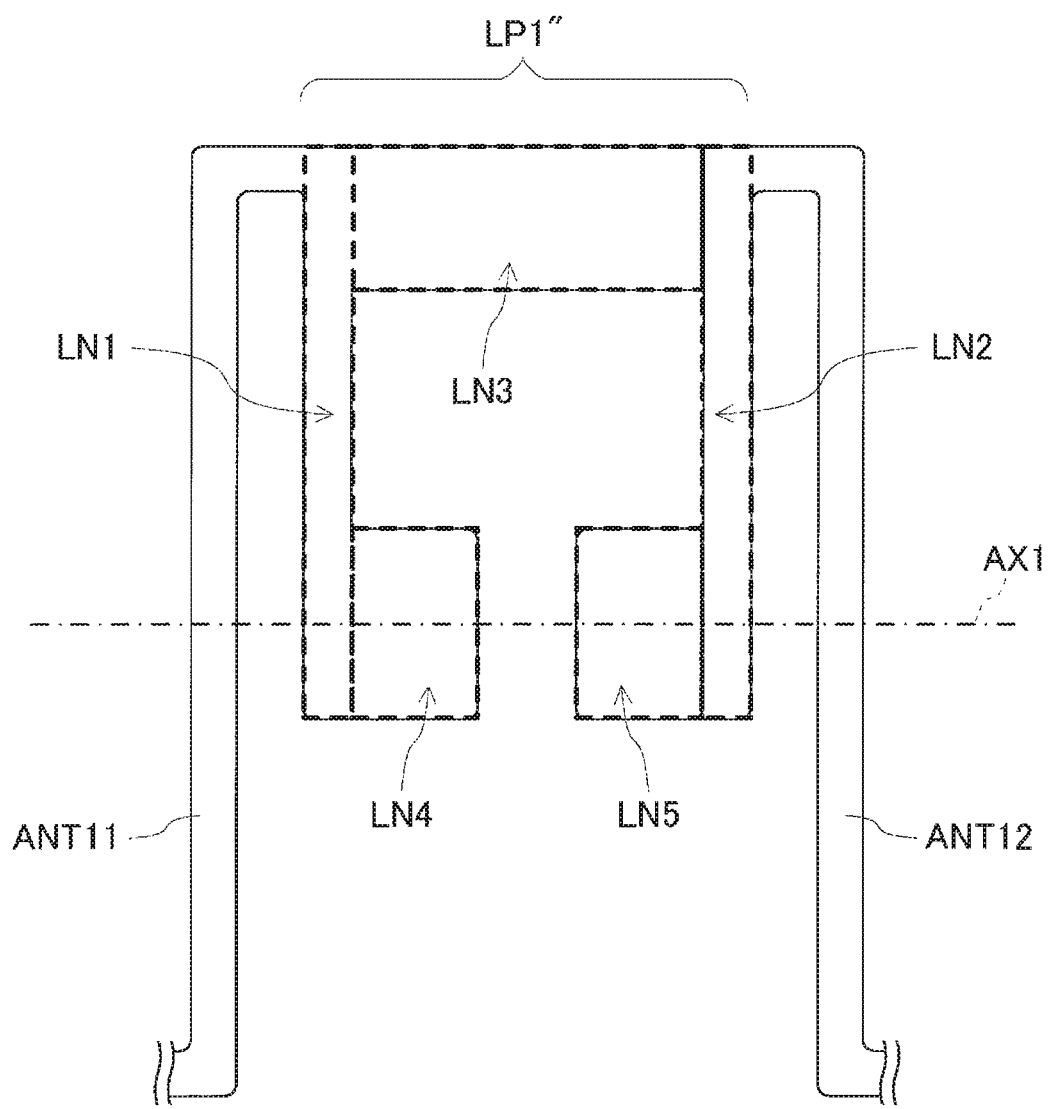
FIG. 21 is a plan view of a main portion of an antenna element of an RFID tag of another example of a preferred embodiment of the present invention.

Describing in detail with reference to FIG. 21, the loop LP1" includes two portions LN1, LN2 extending along the long sides of the meander pattern and three portions LN3 to LN5 extending along the short sides of the meander pattern.

More specifically, each of the portions LN1 and LN2 is slightly longer than about ½ of a long side of the meander pattern. The portion LN1 is disposed closer to the linear antenna portion ANT11 relative to the center of the loop LP1", and the portion LN2 is disposed closer to the linear antenna portion ANT12 relative to the center of the loop LP1". The linear antenna portion ANT11 is connected to one end of the portion LN1 by a short side of the meander pattern, and the linear antenna portion ANT12 is connected to one end of the portion LN2 also by a short side of the meander pattern.

One end of the portion LN1 is connected through the portion LN3 to one end of the portion LN2. The portion LN4 extends from the other end of the portion LN1 as a base point toward the linear antenna portion ANT12, and the portion LN5 extends from the other end of the portion LN2 as a base point toward the linear antenna portion ANT11. A tip of each of the portion LN4 and LN5 are an open end and the portions LN4 and LN5 act as connecting portions CN11" and CN12", respectively.

Returning to FIGS. 20A and 20B, the RFIC element 14 is mounted on the loop LP1" to extend between the connecting portions CN11" and CN12". Since the length of the portions LN1, LN2 is approximately ½ the length of the long side of the meander pattern, the RFIC element 14 is disposed at a position overlapping with the axis AX1 in planar view.

Referring to FIG. 21 again, the line width of the linear antenna portion ANT11 is identical or substantially identical to the line width of the linear antenna portion ANT12, and the line width of both the portions LN1, LN2 is identical or substantially identical to line widths of the linear antenna portions ANT1, ANT12. Based on this, the line width of the portion LN3 is approximately three times as large as the line width of the portions LN1, LN2, and the line width of the portions LN4, LN5 are approximately four times as large as the line width of the portions LN1, LN2, for example.

Therefore, the line width of the portion LN3 (the portion extending parallel or substantially parallel with the straight line connecting the connecting portions CN11" and CN12") of the loop LP1" is larger than the line width of the linear antenna portions ANT11, ANT12 and is also larger than the line width of the portions LN1, LN2. As a result, even if the antenna element 12 is twisted in the rotation direction of the axis AX1, the stress attributable to this twist is not sufficiently transmitted to the bonding portions of the connecting portions CN11", CN12" and the RFIC element 14, so that the reliability of the connection between the loop LP1" and the RFIC element 14 is improved.

Additionally, the linear antenna portions ANT11 and ANT12 are respectively connected to the one end of the portion LN1 and the one end of the portion LN2 and, therefore, when the antenna element 12 is pulled in the longitudinal direction of the axis AX1, the tensile stress is intensively applied to the one ends of the portions LN1, LN2 and thus the portions LN3. Based on this fact, the RFIC element 14 is connected to the portions LN4 and LN5 respectively extending from the other end of the portion LN1 and the other end of the portion LN2. As a result, the concern about falling off of the RFIC element 14 from the antenna element 12 due to the tensile stress is reduced.

In any of the preferred embodiments and the modifications and examples described above, the antenna element 3, 3', 12, 12', or 12" preferably is integrally made of a material having form elasticity and is entirely exposed without being supported by a typical support film (resin base material) of PET, PI, etc. Additionally, the linear antenna portions ANT1, ANT2, ANT1', ANT2', ANT11, ANT12 include a meander pattern extending in a direction away from the loops LP0, LP0', LP1, LP1', LP1".

Figure 22:
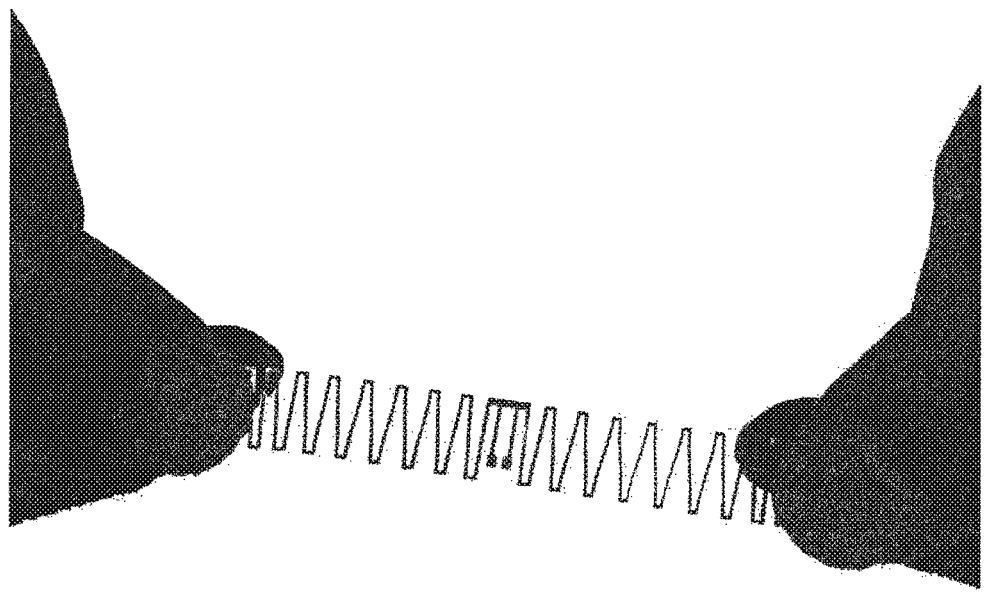
FIG. 22 is a photograph of an antenna element being pulled.
Figure 23:
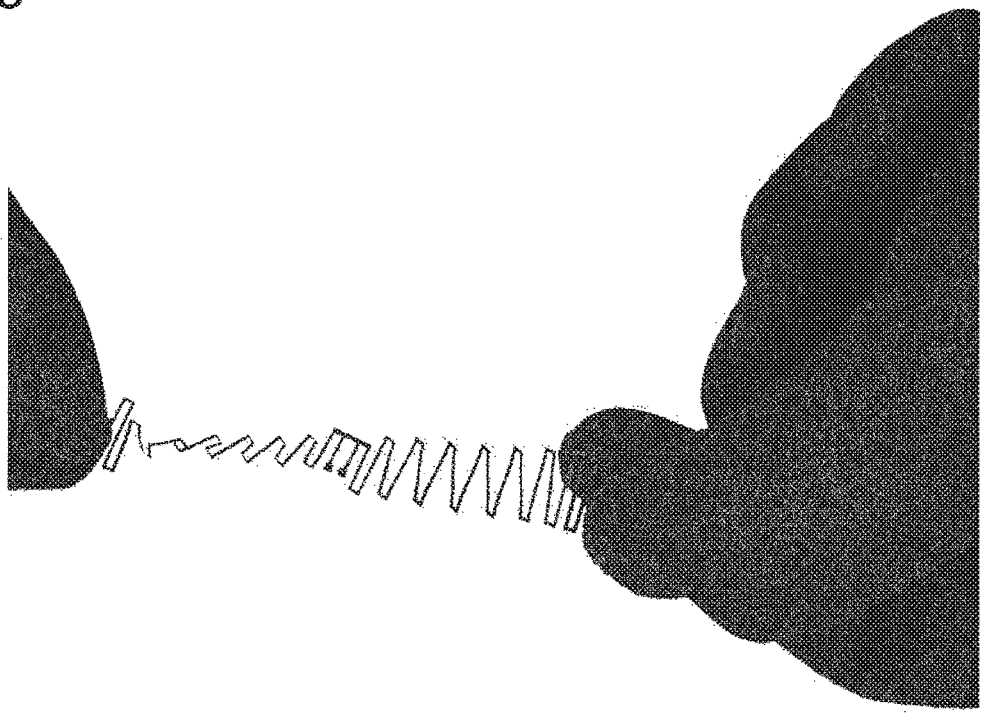
FIG. 23 is a photograph of an antenna element being twisted.
Figure 24:
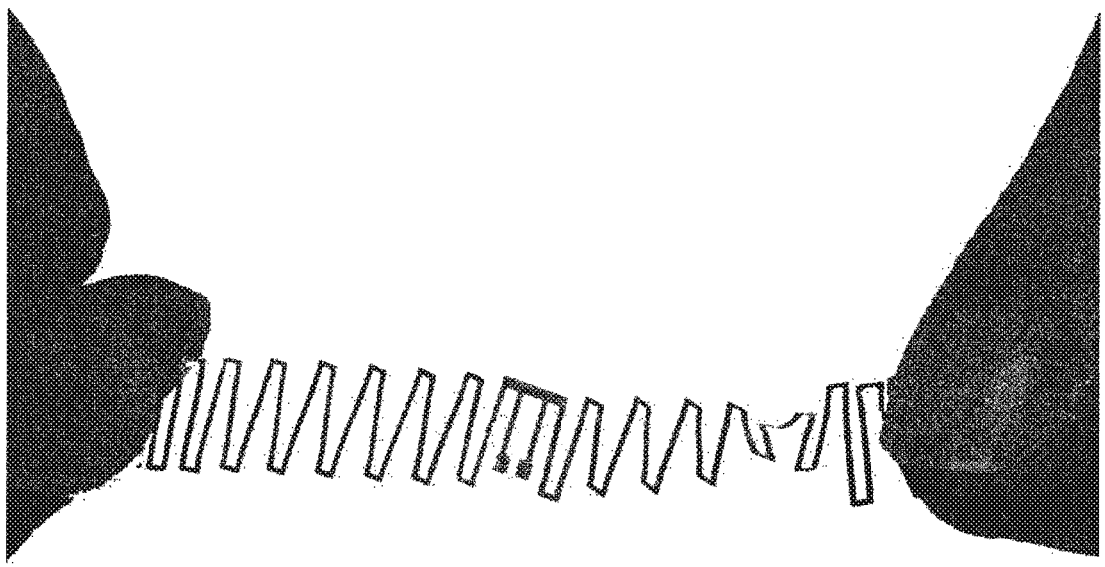
FIG. 24 is a photograph of an antenna element being twisted in the opposite direction.

Since no support film is included and the meander pattern is adopted, the antenna elements 3, 3', 12, 12', 12" flexibly deform in accordance with a tensile stress shown in FIG. 22 and a twisting stress shown in FIGS. 23 and 24. Allowing the deformation following the longitudinal tension and the twisting reduces the concern about connection failure such as falling off of the RFIC elements 2, 14 and breaking of the antenna elements 3, 3', 12, 12', 12".

Additionally, if the antenna elements 3, 3', 12, 12', 12" are supported by a support film, a chemical agent cannot easily penetrate a contact surface with the support film during cleaning, so that dirt or the chemical agent may remain in the antenna elements 3, 3', 12, 12', 12". In contrast, since no support film is included in the examples described above, such a concern is eliminated.

In the examples described above, the RFID tag 10 is attached to laundry objects such as clothes, linens, or shoes so as to manage clothes such as uniforms, linens such as towels and sheets, and shoes used in clean rooms etc. of manufacturing factories. However, the RFID tag 10 may be attached to medical gauze, paper diapers, etc. so as to prevent those used in a surgical operation from being left. Therefore, the RFID tag may be used as a tag attached to flexible texture.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication device comprising:
    an RFIC element including two input/output terminals; and
    an antenna element including two connecting portions respectively connected to the two input/output terminals of the RFIC element and a linear antenna portion with both ends open and defining and functioning as a radiator; wherein
    the antenna element is made of an elastic material;
    the antenna element includes a loop including:
        the two connecting portions; and
        a wide line portion extending parallel or substantially parallel with a straight line connecting the two connecting portions, the wide line portion having a line width larger than a line width of the linear antenna portion;
    the wide line portion extends beyond a width of the loop in a direction along the straight line; and
    the linear antenna portion is connected to ends of the wide line portion of the loop.

2. The wireless communication device according to claim 1, wherein a line width of an entire circumference of the loop is larger than the line width of the linear antenna portion.

3. The wireless communication device according to claim 1, wherein the open-end portions of the linear antenna portion have a line width larger than the line width of other portions of the linear antenna portion.

4. The wireless communication device according to claim 1, wherein the linear antenna portion includes a meander pattern extending in a direction away from the loop.

5. The wireless communication device according to claim 1, wherein at least a surface of the linear antenna portion is an exposed surface that is entirely exposed.

6. The wireless communication device according to claim 1, wherein the antenna element is defined by an elastic metal plate punched material.

7. The wireless communication device according to claim 6, wherein the metal plate is made of stainless steel.

8. The wireless communication device according to claim 1, wherein the RFIC element is an RFIC package including an RFIC chip and a matching circuit, the matching circuit including a resonance circuit connected to the RFIC chip and having a resonance frequency corresponding to a communication frequency.

9. The wireless communication device according to claim 1, wherein the wireless communication device is an RFID tag mounted on a laundry object.

10. The wireless communication device according to claim 9, wherein the wireless communication device is attached to the laundry object without a resin base material.

11. A wireless communication device comprising:
    an RFIC element including two input/output terminals; and
    an antenna element including two connecting portions respectively connected to the two input/output terminals of the RFIC element and a linear antenna portion with both ends open and defining and functioning as a radiator; wherein
    the antenna element is integrally made of a material with form elasticity without having a support film bonded to the antenna element;
    the antenna element includes a loop portion including:
        the two connecting portions; and
        a wide line portion extending parallel or substantially parallel with a straight line connecting the two connecting portions, the wide line portion having a line width larger than a line width of the linear antenna portion, and the wide line portion extending beyond a width of the loop portion in a direction along the straight line;
    the linear antenna portion is connected to ends of the wide line portion of the loop portion, and the linear antenna portion includes a meander pattern extending in a direction away from the loop portion; and the antenna element is flexible and is able to be flexibly deformed.

12. The wireless communication device according to claim 11, wherein a line width of an entire circumference of the loop portion is larger than the line width of the linear antenna portion.

13. The wireless communication device according to claim 11, wherein the open-end portions of the linear antenna portion have a line width larger than the line width of other portions of the linear antenna portion.

14. The wireless communication device according to claim 11, wherein at least a surface of the linear antenna portion is an exposed surface that is entirely exposed.

15. The wireless communication device according to claim 11, wherein the antenna element is defined by an elastic metal plate punched material.

16. The wireless communication device according to claim 15, wherein the metal plate is made of stainless steel.

17. The wireless communication device according to claim 11, wherein the RFIC element is an RFIC package including an RFIC chip and a matching circuit, the matching circuit including a resonance circuit connected to the RFIC chip and having a resonance frequency corresponding to a communication frequency.

18. The wireless communication device according to claim 11, wherein the wireless communication device is an RFID tag mounted on a laundry object.

19. The wireless communication device according to claim 18, wherein the wireless communication device is attached to the laundry object without a resin base material.

20. An article to which the wireless communication device according to claim 1 is attached.

21. The article to which the wireless communication device is attached according to claim 20, wherein the article is a laundry object.

22. The article to which the wireless communication device is attached according to claim 21, wherein the laundry object is a cloth, linen, or shoe.

23. An article to which the wireless communication device according to claim 11 is attached.

24. The article to which the wireless communication device is attached according to claim 23, wherein the article is a laundry object.

25. The article to which the wireless communication device is attached according to claim 24, wherein the laundry object is a cloth, linen, or shoe.

* * * * *